(12) United States Patent
Mizutani et al.

(10) Patent No.: US 6,758,640 B2
(45) Date of Patent: Jul. 6, 2004

(54) METHOD AND APPARATUS FOR CONTROLLING MOVEMENT OF CUTTING BLADE AND WORKPIECE

(75) Inventors: Hajime Mizutani, Toyota (JP); Yoshihiro Takasu, Isshikiecho (JP); Eiji Goto, Toyota (JP); Katsumi Isogai, Okazaki (JP); Yoshikazu Satow, Nagoya (JP)

(73) Assignee: Fuji Seiko Limited, Toyota (JP)

( * ) Notice: Subject to any disclaimer, the term of this patent is extended or adjusted under 35 U.S.C. 154(b) by 153 days.

(21) Appl. No.: 09/972,164

(22) Filed: Oct. 9, 2001

(65) Prior Publication Data

US 2002/0197122 A1 Dec. 26, 2002

(30) Foreign Application Priority Data

Oct. 11, 2000 (JP) ....................................... 2000-310236
Oct. 11, 2000 (JP) ....................................... 2000-310237

(51) Int. Cl.[7] .......................... B23C 9/00; B23Q 17/00; B23Q 17/22
(52) U.S. Cl. .................. 409/131; 409/186; 409/136; 409/193; 82/1.11; 82/173; 408/1 R; 408/8; 408/13; 408/16; 408/710; 700/175; 324/71.1; 324/76.11; 324/133
(58) Field of Search ............................... 409/131–132, 409/133, 186–188, 135–136, 193–195, 207–209, 134, 147–149; 82/1.11, 173; 408/1 R, 2, 8–13, 16, 710; 700/175; 483/2, 7–9; 324/71.1, 76.11, 133

(56) References Cited

U.S. PATENT DOCUMENTS

| | | | | |
|---|---|---|---|---|
| 3,476,013 A | * | 11/1969 | Zemberry ..................... | 408/16 |
| 4,203,691 A | * | 5/1980 | Nishimura et al. ........... | 408/13 |
| 4,329,771 A | * | 5/1982 | Eto et al. ....................... | 483/4 |
| 4,396,322 A | * | 8/1983 | Nomura et al. ............. | 409/134 |
| 4,657,451 A | * | 4/1987 | Tanaka ........................ | 409/186 |
| 5,030,920 A | * | 7/1991 | Nakamura ................... | 324/721 |
| 6,481,939 B1 | * | 11/2002 | Gillespie et al. ............ | 409/131 |
| 2003/0002943 A1 | * | 1/2003 | Ulbrich ........................ | 409/1 |

FOREIGN PATENT DOCUMENTS

| | | | |
|---|---|---|---|
| EP | 000737903 A2 | * | 10/1996 |
| JP | A 60-39051 | | 2/1985 |
| JP | A 60-48246 | | 3/1985 |
| JP | A 61-164764 | | 7/1986 |
| JP | A 62-99060 | | 5/1987 |
| JP | 62-136346 A | * | 6/1987 |
| JP | A 63-191552 | | 8/1988 |
| JP | U 64-12759 | | 1/1989 |
| JP | U 1-74045 | | 5/1989 |
| JP | A 3-190607 | | 8/1991 |
| JP | A 5-293744 | | 11/1993 |
| JP | 6-300508 A | * | 10/1994 |

* cited by examiner

*Primary Examiner*—Erica Cadugan
(74) *Attorney, Agent, or Firm*—Oliff & Berridge, PLC

(57) ABSTRACT

A method of controlling a relative movement of a cutting blade and a workpiece which are moved relative to each other by a movement device in an operation with a machine tool. The method includes a step of bringing the cutting blade and an object into contact with each other, by moving at least one of the cutting blade and the object toward each other by the movement device, and a step of controlling the relative movement on the basis of a relative position of the cutting blade and the object which is detected by the movement device upon the contact of the cutting blade and the object with each other. The method further includes: a checking step of checking if a contact detecting device for detecting the contact of the cutting blade and the object is in a normal condition in which the contact detecting device is capable of detecting the contact when the cutting blade and the object are brought into contact with each other; and a contact determining step of determining that the cutting blade and the object have been brought into contact with each other, in accordance with an output provided by the contact detecting device.

39 Claims, 15 Drawing Sheets

METHOD AND APPARATUS FOR CONTROLLING MOVEMENT OF CUTTING BLADE AND WORKPIECE

BACKGROUND OF THE INVENTION

1. Field of the Invention

The present invention relates to a method of controlling a position of a cutting blade in an operation with a machine tool, and an apparatus suitable for carrying out the method. It is noted that the present invention is applicable to any kind of cutting blades. The cutting blade may be constituted by the entirety of a cutting tool, for example, where the cutting tool consists of a solid tool which is provided by a single piece, or may be constituted by a portion of a cutting tool, for example, where the cutting tool includes a main body and a cutting tip or insert. In the latter case, the cutting blade is constituted by the cutting insert, which is removably attached to the main body.

2. Discussion of Related Art

In an operation with a machine tool, a cutting blade and a workpiece are moved relative to each other, whereby the workpiece is machined or cut by the cutting blade, so as to form a final or intermediate product having desired configuration and dimension. In the operation, a relative position of the cutting blade and the workpiece has to be appropriately controlled, for surely obtaining the desired configuration and dimensions. For example, in an automatic machine tool such as a numerically controlled machine tool in which a movement device for moving at least one of the cutting tool and the workpiece is controlled in accordance with a predetermined program, the relative position of the cutting blade and the workpiece has to be accurately detected. Namely, it is necessary to accurately obtain a distance, as viewed in each of directions parallel to controlled axes of the machined tool, between a predetermined portion of the workpiece (e.g., a reference point in the workpiece which point serves as an origin of coordinates for a cutting program), and a cutting point of the cutting blade when the cutting blade and the workpiece are positioned relative to each other in a predetermined position (e.g., a "machine home position" which is a known position within a machining space of the machine tool). To this end, prior to an actual cutting operation, there is conventionally required a step in which a touch probe (i.e., a detecting prove of a touch sensor) or a cutting blade is brought into contact with an object (e.g., a master workpiece, and a reference portion of the machine tool), and the relative position of the touch probe (or the cutting blade) and the object upon contact of the touch probe (or the cutting blade) with the object is read out from a position detecting device. In the cutting operation, the relative position of the cutting blade and the workpiece is controlled by controlling the movement device on the basis of the read-out contact position which serves as a reference position.

The present invention is applied to an apparatus and a method of detecting the relative position of a cutting blade and a workpiece, by bringing the cutting blade into contact with the object, without using a touch sensor. For example, where an automatic lathe such as a NC (numerically controlled) lathe is used as the machine tool for cutting an outer circumferential surface of the workpiece, a cutting point of the cutting blade is brought into contact with a surface of the object, by moving the cutting blade and the workpiece relative to each other in a radial direction of the workpiece. When the cutting point of the cutting blade is brought into contact with the surface of the object, the position of the cutting point and that of the contacted surface of the object is coincident with each other as viewed in the radial direction. Therefore, if a relative position of the contacted surface and the workpiece is known, it is possible to accurately form the workpiece into a product having desired configuration and dimension, by controlling the relative movement of the cutting blade and the workpiece on the basis of the contact position in which the cutting point of the cutting blade is brought into contact with the contacted surface of the object.

Also where a milling machine or a machining center is used as the machine tool for cutting a workpiece with a rotary cutting tool, the workpiece can be formed into a product having desired configuration and dimension in substantially the same manner as described above. However, in a cutting operation with a machining center, it is common that the rotary cutting tool and the workpiece are both moved so that the relative movement required for the cutting operation is obtained by combination of the movements of the cutting tool and the workpiece, although there is a case where only the rotary cutting blade is moved while the workpiece is held stationary. Where the rotary cutting tool and the workpiece are both moved, the relative movement is controlled by controlling a workpiece movement device for moving a workpiece holding member (e.g., a work table) which holds the workpiece, and also a tool movement device for moving a tool holding member (e.g., a headstock) which rotatably holds a spindle into which the cutting tool is received. When the rotary cutting tool is brought into contact with an object so as to detect the relative position as the contact position, the rotary cutting tool and the object are moved toward each other with or without the rotary cutting tool being rotated. Where the rotary cutting tool is brought into contact with contacted object with the rotary cutting tool being rotated, it is possible to determine, as the contact position, the relative position in which the object is brought into contact with one of cutting points of respective cutting blades of the cutting tool which one has a lager radial distance from the axis of the cutting tool than the other cutting points. This is advantageous, particularly, in a case where a difference among the radial distances from the respective cutting points to the tool axis has been increased, for example, due to wear of the cutting points as a result of a long service of the cutting tool.

Where the touch sensor is used for obtaining the above-described contact position, a required cost for the apparatus is increased due to expensiveness of the touch sensor itself. Further, the use of the touch sensor is likely to cause a reduction in accuracy of positioning of the cutting blade unless a positional relationship between the touch sensor and the cutting blade is accurately known. These problems could be resolved by using the cutting blade in place of the touch sensor. However, the use of the cutting blade provides a risk of damaging the cutting blade, the object or holders holding the cutting blade and the object, unless the contact of the cutting blade with the object is surely detected. For detecting the contact of the cutting blade with the object, there is conventionally used an electric circuit including the cutting blade, the object and a power source which are arranged in series. When the cutting blade and the object are separated from each other, the electric circuit is open without an electric current flowing therethrough. When the cutting blade is in contact with the object, the electric circuit is closed whereby an electric current flows therethrough. In this arrangement, it is possible to momentarily detect the contact of the cutting blade with the object, and accordingly detect the contact position, by detecting a state of the power source with a detector, namely, by detecting the electric current flowing from the power source with a current detector. However, in the event of a failure of the power source or the detector, or a trouble with disconnection of lead wires of the electric circuit, the contact of the cutting blade with the object would not be detected, whereby the cutting blade and the object are further forced to each other, causing the above-described risk of damaging the cutting blade, the object or members holding the cutting blade and the object.

Even without the above-described failure or disconnection trouble, the use of the cutting blade for the contact with the object would suffer from various problems. For example, the contact of the cutting blade with the object is likely to cause "chipping" of the cutting blade, or otherwise damage or undesirably cut the object. That is, the cutting blade is likely to chip where the contact is made without rotation of the cutting blade or the object, while the object is likely to be damaged or undesirably cut where the contact is made with rotation of the cutting blade or the object. If a member having an extremely high degree of hardness is used as the object in the interest of avoiding undesirable cut of the object, the cutting blade would be worn or chipped more easily. Another problem is caused where the entirety of the cutting blade or at least the cutting edge of the cutting blade is provided by a material having a high degree of electric resistance or a material having substantially no electrical conductivity. That is, where the cutting blade is made of a ceramic material, or where the cutting edge is made of a diamond sintered body or CBN (cubic boron nitrides) sintered body, its is extremely difficult or impossible to detect the contact of the cutting blade with the object.

Further, the conventional technique for detecting the contact of the cutting blade with the object suffer from some other drawbacks, for example, where the cutting blade attached to a holder of the machine tool is a wrong cutting blade which is not a cutting blade designated in a cutting operation program. More specifically, in a case where the cutting blade is provided by a replaceable cutting insert of a cutting tool used for a lathe cutting operation, if the cutting blade is a wrong cutting blade (i.e., a wrong cutting insert), the wrong cutting blade is likely to be brought into contact with an unexpected portion of the workpiece in the lathe cutting operation, whereby the cutting blade or the workpiece could be damaged, or the workpiece could not be formed into a product having desired configuration and dimension. In a case where the cutting blade is provided by a rotary cutting tool used for a milling operation, the position of the axis of the rotary cutting tool relative to the workpiece is controlled during their relative movement in a direction perpendicular to the axis of the rotary cutting tool, i.e., in X- or Y-axis direction. Thus, in such a milling operation, if the wrong rotary cutting tool has a diameter different from that of a correct rotary cutting tool, the workpiece is likely to be cut by the wrong rotary cutting tool with a radial depth of cut which is smaller or larger than a desired value, thereby making it impossible to form the workpiece into a product having desired configuration and dimension, and also even causing a risk of damaging the rotary cutting and the workpiece. It is needless to say that the same problems would be encountered where the wrong rotary cutting tool has an axial length different from that of a correct rotary cutting tool, since the workpiece is likely to be cut by the wrong rotary cutting tool with an axial depth of cut which is different from that a desired value.

SUMMARY OF THE INVENTION

It is therefore an object of the present invention to improve the reliability of a detection of contact of a cutting blade and an object, in techniques for detecting a contact position in which the cutting blade and the object have been brought into contact with each other, and then controlling a relative position of the cutting blade and a workpiece that is to be cut by the cutting blade, on the basis of the detected contact position. In other words, the object of this invention is to eliminate or minimize the above-described problems or drawbacks encountered in the conventional techniques.

The above object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A method of controlling a relative movement of a cutting blade and a workpiece which are moved relative to each other by a movement device in an operation with a machine tool, the method comprising a step of bringing the cutting blade and an object into contact with each other, by moving at least one of the cutting blade and the object toward each other by the movement device, and a step of controlling the relative movement on the basis of a relative position of the cutting blade and the object which is detected by the movement device upon the contact of the cutting blade and the object with each other, the method further comprising:

a checking step of checking if a contact detecting device for detecting the contact of the cutting blade and the object is in a normal condition in which the contact detecting device is capable of detecting the contact when the cutting blade and the object are brought into contact with each other; and a contact determining step of determining that the cutting blade and the object have been brought into contact with each other, in accordance with an output provided by the contact detecting device.

In the present method, at least one of the cutting blade and the object is moved toward each other for achieving their mutual contact, after or while it is checked if the contact detecting device is held in the normal condition in which the contact detecting device is capable of detecting the contact of the cutting blade and the object when they are actually brought into contact with each other. This arrangement is effective to prevent failure to detect the actual contact, making it possible to avoid a dangerous situation in which the above-described at least one of the cutting blade and the object is further moved toward each other even after the actual contact, causing a risk of damaging the cutting blade, the object or holders holding the cutting blade and the object. The movement device is controlled to immediately stop the movement toward each other, in response to the detection of the contact. An experiment conducted by the present inventors revealed that a time required for stopping the movement after the detection of the contact can be reduced to be considerably small, and that the cutting blade or the object is not damaged by a minimized inertial motion or overrunning of the cutting blade and/or the object. It is noted that the term "cutting blade" may be interpreted to be constituted by the entirety of a cutting tool, for example, where the cutting tool consists of a solid tool which is commonly made of a single material, or may be interpreted to be constituted by a portion of a cutting tool, for example, where the cutting tool includes a main body and a cutting tip or insert which is commonly made of a material different from that of the main body. In either of the former and latter cases, the cutting blade includes at least a cutting edge and an adjacent portion of the cutting tool which portion is adjacent to the cutting edge.

(2) A method of controlling a relative movement of a cutting blade and a workpiece which are moved relative to each other by a movement device in an operation with a machine tool, the method comprising a step of bringing the cutting blade and an object into contact with each other, by moving at least one of the cutting blade and the object toward each other by the movement device, and a step of controlling the relative movement on the basis of a relative position of the cutting blade and the object which is detected by the movement device upon the contact of the cutting blade and the object with each other, the method further comprising:

a first-circuit preparing step of preparing a first circuit which includes the object and the cutting blade arranged in series to each other and which is connected to a power source, the first circuit being closed when the cutting blade and the object are in contact with each other, while being open when the cutting blade and the object are not in contact with each other;

a second-circuit preparing step of preparing a second circuit which includes a resistance and which is connected in parallel with the first circuit, the second circuit being closed irrespective of whether the cutting blade and the object are in contact with each other or not;

a checking step of detecting a state of the power source by a power source detector when the first circuit is open, and checking if each of the power source and the power source detector is in a normal condition; and a contact-position determining step of determining, as a contact position in which the cutting blade and the object are brought into contact with each other, the relative position of the cutting blade and the object when the state of the power source detected by the power source detector indicates transition from an open state in which the first circuit is open, to a closed state in which the first circuit is closed.

In the method according to this mode (2), when the cutting blade and the object are not in contact with each other, an electric current flows through the second circuit but does not flow through the first circuit since the first circuit is held open. On the other hand, when the cutting blade and the object are in contact with each other, the first circuit is closed so that the electric current flows through the fist circuit as well as through the second circuit. In this instance, an amount of the flowing electric current is increased since the first and second circuits are connected in parallel with respect to the electric power. In view of this, for preventing the electric power or the detector from being damaged by the flow of an excessively increased amount of the electric current, it is preferable to employ, as the power source, a power source having a current limiter which restricts the flow of the electric current to a certain amount, or alternatively provide a resistance having a certain resistance value in the first circuit. The resistance to be provided in the first circuit may be constituted by a suitable device such as a fixed or variable resistor, or a main body portion of the machine tool, which is connected to the first circuit so that a resistance inherently contained in the main body portion of the machine tool acts on the first circuit. In any one of these cases, it is preferable that the resistance of the second circuit has a value not smaller than that of the resistance of the first circuit, or more preferable that the former has a value much larger than that of the latter, so that the open state in which the first circuit is open can be easily distinguishable from the closed state in which the first circuit is closed, on the basis of change of the amount of the flowing electric current.

However, it should be noted that the value of the resistance of the second circuit has to be sufficiently small such that the flowing electric current can be easily detectable by the detector even where the electric current flows only through the second circuit, for enabling the detector to surely detect a failure state in which the electric current can not flow through the second circuit, for example, due to a failure of the power source or the detector, or due to a disconnection or damage of a conductive member such as a lead wire. That is, in this arrangement, the detector does not fail to detect such a failure state in which the contact of the cutting blade with the object is not detectable. The relative movement of the cutting blade and the object toward each other under the failure state is advantageously prevented, thereby avoiding a risk of damage of the cutting blade or the object, which could be caused if the relative movement is erroneously continued even after the contact of the cutting blade with the object.

(3) A method according to mode (2), wherein the checking step is implemented to detect a value of an electric current flowing from the power source when the first circuit is open, and determine that each of the power source detector and the power source is in the normal condition if the detected value of the electric current is not smaller than a predetermined first value which is larger than zero and is not larger than a predetermined second value which is larger than the predetermined first value.

The detection of the state of the electric power may be achieved in various manners. For example, where an electric voltage between output terminals of the power source is momentarily reduced at the moment of an abrupt increase of the amount of the flowing electric current upon closing of the first circuit, it is possible to detect the contact of the cutting blade with the object, by detecting the reduction of the electric voltage. However, the contact of the cutting blade with the object can be easier and more reliably detected by detecting an abrupt increase of the electric current supplied from the power source on the basis of the output of an electric current detector, rather than detecting the reduction of the electric voltage.

(4) A method according to mode (3), wherein the contact-position determining step is implemented to determine, as the contact position, the relative position of the cutting blade and the object when the value of the electric current flowing from the power source exceeds a predetermined third value which is larger than the predetermined second value.

The predetermined third amount is preferably larger than the amount of the electric current flowing through the first circuit when a cutting point of the cutting blade and the a surface of the workpiece connected to each other via a cutting fluid. Where the cutting blade and the object are brought into proximity to each other with at least one of them being wet with the cutting fluid, the first circuit is almost closed by the cutting fluid even before the contact of them, leading to an increase in the amount of the flowing electric current. Therefore, it is preferable that the predetermined third amount is sufficiently large such that such an increase in the amount of the electric current due to the cutting fluid does not provide an erroneous determination that the cutting blade and the object are in contact with each other.

(5) A method of controlling a relative movement of a cutting blade and a workpiece which are moved relative to each other by a movement device in an operation with a machine tool, the method comprising a step of bringing the cutting blade and an object into contact with each other, by moving at least one of the cutting blade and the object toward each other by the movement device, and a step of controlling the relative movement on the basis of a relative position of the cutting blade and the object which is detected by the movement device upon the contact of the cutting blade and the object with each other, the method further comprising:

a resistance-circuit preparing step of preparing a resistance circuit in which the object and the cutting blade are connectable to each other via a first resistance which has a predetermined first resistance value;

a checking step of checking if a value of an electric resistance acting between the object and the cutting blade is substantially equal to the predetermined first resistance value of the first resistance when the cutting blade and the object are not in contact with each other; and a contact determining step of determining that the cutting blade and the object have been brought into contact with each other when the value of the electric resistance acting between the object and the cutting blade is reduced to be smaller than a predetermined second resistance value which is smaller than the first resistance value.

(6) A method according to any one of modes (1)–(5), wherein the object consists of the workpiece which is fixed to the machine tool.

(7) A method according to any one of modes (1)–(5), wherein the object consists of a master workpiece which is fixed to the machine tool.

The master workpiece may have a dimension substantially identical to a desired dimension of a product which is to be formed from the workpiece, or may have a dimension different from the desired dimension of the product. In the latter case, it is possible to use the single master workpiece as a common master workpiece, for operations in which various kinds of products having different desired dimensions are formed from respective workpieces.

(8) A method according to any one of modes (1)–(5), wherein the object consists of a reference portion of the machine tool.

(9) A method according to any one of modes (1)–(8), wherein the cutting blade consists of a cutting insert attached to a main body of a cutting tool, the main body including a shank portion and cooperating with the cutting insert to constitute the cutting tool.

(10) A method according to any one of modes (1)–(8), wherein the cutting blade consists of at least a part of a rotary cutting tool which is attached to a tool spindle of the machine tool.

(11) A method according to mode (10), wherein the cutting blade and the object are brought into contact with each other while the rotary cutting tool is being rotated.

(12) A method according to any one of modes (2)–(4), wherein the resistance of the second circuit is connected between two mutually-insulated members, the method further comprising a covering step of covering a surface of at least one of the two mutually-insulated members, with an insulating layer made of an electrically insulating material, for preventing the state of the power source from erroneously indicating the transition from the open state to the closed state when the two mutually-insulated members are shorted to each other by a substance sticking to the mutually-insulated members while the cutting blade and the object are not in contact with each other.

This arrangement is effective to prevent an erroneous determination of the transition from the open state to the closed state when the two-mutually insulated members are shorted to each other by the sticking substance such as a cutting fluid and cutting chips, namely, when the two members are connected through a by-passing passage which is formed of the sticking substance and which is positioned in parallel with the resistance of the second circuit. It is noted that the technique, defined in this mode (12), of covering the surface of a member or members with the insulating layer may be applied to each of the methods defined in the above-described modes (5)–(11).

(13) A method according to any one of modes (1)–(12), further comprising a breakage determining step of determining that there is a possibility that the cutting blade has been damaged, if the contact of the cutting blade and the object is not detected while the relative position detected by the movement device satisfies a positional condition required for the contact of the cutting blade and the object.

In the method defined in this mode (13), it is determined that the cutting blade has been possibly damaged if the contact of the cutting blade and the object is not detected while the relative position detected by the movement device satisfies the positional relationship required for achieving the contact of the cutting blade and the object. That is, this determination is made, for example, in a case where the contact is not detected by the contact detecting device which is kept activated while the cutting blade and the workpiece as the object have been apparently moved relative to each other to a relative position in which they should be in contact with each other in a process of their relative movement toward each other in an initiation of a cutting operation, or in a case where the contact is not detected by the contact detecting device which is still kept activated for detecting contact while the workpiece is being cut by the cutting blade during a cutting operation. An operator, when this determination is made, can take a necessary procedure after checking the condition of the cutting blade, for example, in response to an activation of an alarm light or an alarm buzzer informing the operator that the cutting blade has been possibly damaged. In the method of this mode (13), the possible damage of the cutting blade is easily detected. It is preferable that the relative movement of the cutting blade and the workpiece is automatically stopped immediately after the determination of the possible damage of the cutting blade has been made.

(14) A method according to any one of modes (1)–(13), further comprising a touch-probe detecting step of detecting a contact of the object and a touch probe which is provided to be unmovable relative to the cutting blade.

The use of the touch probe makes it possible to detect a position which is impossible or difficult to be detected with the use of the cutting blade. For example, in an operation with a lathe, it is possible to detect the position of an axis of the workpiece or the master workpiece which is fixed to a chuck of the lathe, by bringing a spherical contact end of the touch probe in contact with two portions of an outer circumferential surface of the workpiece or master workpiece which portions are diametrically opposed to each other. Detecting such a position as the axis is impossible or difficult by using the cutting blade. After the position of the axis of the workpiece or master workpiece has been detected, the relative movement of the cutting blade and the workpiece can be controlled on the basis of the detected position of the axis, if a position of the cutting blade relative to the touch probe is known. It is preferable but not essential that the touch probe is checked before the touch probe is brought into contact with the workpiece or master workpiece in substantially the same manner as in the above-described checking step. Where the step of checking the tough probe is implemented, the implementation of the above-described checking step is not essential.

(15) A method according to any one of modes (1)–(14), wherein the contact determining step includes an actual-contact determining step of determining that the cutting blade and the object are actually brought into contact with each other when a predetermined first condition is satisfied, and wherein the predetermined first condition is different from a predetermined second condition which is required to determine that the cutting blade and the object are spaced apart from each other and are shorted to each other by a cutting fluid, so that an actual contact of the cutting blade and the object is distinguishable from a short of the cutting blade and the object by the cutting fluid.

In the method defined in this mode (15), the predetermined first and second conditions may include respective first and second output-value-related requirements that a value of the output provided by the contact detecting device is held in respective first and second predetermined ranges which are different from each other. For example, the value of the output may consist of a value of flowing electric current. In this case, a lower limit of the first predetermined range is adapted to be larger than that of the second predetermined range, since the value of the flowing electric current is larger when the cutting blade and the object are actually brought into contact with each other, than when they are shorted to each other by the cutting fluid which inherently has a certain degree of resistance.

(16) A method of controlling a relative movement of a cutting blade and a workpiece which are moved relative to each other by a movement device in an operation with a machine tool, the method comprising a step of bringing the cutting blade and an object into contact with each other, by moving at least one of the cutting blade and the object toward each other by the movement device, and a step of controlling the relative movement on the basis of a relative position of the cutting blade and the object which is detected by the movement device upon the contact of the cutting blade and the object with each other, wherein the object consists of the workpiece which is fixed to the machine tool, the method further comprising:
a dimension measuring step of measuring a dimension of the workpiece on the basis of the relative position of the cutting blade and the workpiece as the object upon the contact of the cutting blade and the workpiece as the object with each other, so that the relative movement is controllable on the basis of the measured dimension of the workpiece.

There is known a sizing or measuring device which is attached to a machine tool so as to measure a dimension of a workpiece without removing the workpiece from a workpiece holder holding the workpiece. Data representative of the measured dimension are utilized in a cutting operation so that the relative movement of the cutting blade and the workpiece is controlled on the basis of the data. This controlling method with the measuring device is effective, particularly, for an operation in which a high degree of dimensional accuracy is required. However, such a measuring device is commonly cable of measuring a relatively narrow range of dimension of the workpiece. On the other hand, the method of this mode (16) makes it possible to accurately measure a relatively wide range of dimension of the workpiece, owing to the arrangement in which the cutting blade is used as a contact probe brought into contact with the workpiece, a portion of the movement device for moving at least one of the cutting blade and the workpiece relative to each other is used to move the cutting blade serving as the contact probe, and a portion of the movement device for detecting the relative position of the cutting blade and the workpiece is used as a scale for determining the dimension. The present method is accordingly useful to, particularly, a case where it is required to machine a workpiece having a plurality of portions having respective target dimensions which are considerably different from each other, or machine a plurality of workpieces having respective target dimensions which are considerably different from each other, with high precision. It is noted that the method of this mode (16) can be carried out together with any one or any combinations of the methods defined in the above-described modes (1)–(15).

(17) A method according to any one of modes (1)–(16), wherein the cutting blade is held by a blade holding member, and wherein the cutting blade and the object are brought into contact with each other while a conductive layer having an electrical conductivity is provided in at least one of a space between the cutting blade and the blade holding member, and a space between the cutting blade and the object.

The method defined in each of the above-described modes (1)–(16) can be carried out together with any one or any combinations of methods defined in modes (34)–(50) which are described below. It is noted that the term "blade holding member" may be interpreted to mean a main body of a cutting tool, for example, where the cutting tool includes the main body and the cutting blade in the form of a cutting insert which is held by the main body, or may be interpreted to mean a cutting-tool holding member such as a tool turret or tool holder of a machine tool, for example, where the cutting blade is provided by the entirety of a cutting tool such as a solid tool.

(18) An apparatus for controlling a relative movement of a cutting blade and a workpiece which are moved relative to each other by a movement device in an operation with a machine tool, the apparatus controlling the relative movement on the basis of a relative position of the cutting blade and an object which is detected by the movement device when the cutting blade and the object are brought into contact with each other as a result of a relative movement of the cutting blade and the object which is made by the movement device, the apparatus comprising:
a checking device which checks if a contact detecting device for detecting contact of the cutting blade and the object is in a normal condition in which the contact detecting device detects the contact when the cutting blade and the object are brought into contact with each other; and
a contact determining device which determines that the cutting blade and the object have been brought into contact with each other, in accordance with an output provided by the contact detecting device.

The method defined in the above-described mode (1) can be advantageously carried out by using the apparatus defined in this mode (18).

(19) An apparatus for controlling a relative movement of a cutting blade and a workpiece which are moved relative to each other by a movement device in an operation with a machine tool, the apparatus controlling the relative movement on the basis of a relative position of the cutting blade and an object which is detected by the movement device when the cutting blade and the object are brought into contact with each other as a result of a relative movement of the cutting blade and the object which is made by the movement device, the apparatus comprising:

- a first circuit which includes the object and the cutting blade arranged in series to each other and which is connected to a power source, the first circuit being closed when the cutting blade and the object are in contact with each other, while being open when the cutting blade and the object are not in contact with each other;
- a second circuit which includes a resistance and which is connected in parallel with the first circuit, the second circuit being closed irrespective of whether the cutting blade and the object are in contact with each other or not;
- a power source detector which detects a state of the power source; and
- a control device which commands the movement device to move the cutting blade and the object relative to each other if each of the power source and the power source detector is indicated normal by the power source detector when the first circuit is open, the control device controlling the movement device on the basis of the relative position of the cutting blade and the object which is detected by the movement device when the state of the power source detected by the power source detector indicates transition from an open state in which the first circuit is open, to a closed state in which the first circuit is closed.

The method defined in the above-described mode (2) can be advantageously carried out by using the apparatus defined in this mode (19).

(20) An apparatus according to mode (19), further comprising an insulator which electrically insulates a main body portion of the machine tool from the cutting blade wherein the resistance is connected between the main body portion, and at least one of the cutting blade and a member which has an electrical continuity with the cutting blade.

(21) An apparatus according to mode (19), further comprising an insulator which electrically insulates a main body portion of the machine tool from a workpiece holding member which holds the workpiece, wherein the resistance is connected between the main body portion, and at least one of the workpiece holding member and a member which has an electrical continuity with the workpiece holding member.

The term "main body portion of the machine tool" recited in the modes (20) and (20) may be interpreted to include not only a main structure of the machine tool but also all components of the machine tool which have an electrically continuity with the main structure of the machine tool. That is, all components of the machine tool, located on one of opposite sides of the insulator which one is closer to the main structure rather than to the cutting blade, are included in the "main body portion".

(22) An apparatus according to any one of modes (19)–(21), wherein the resistance includes a resistive layer which is interposed between members each made of an electrically conductive material.

The second circuit can be easily prepared by interposing the resistive layer between the members such as the components of the main body portion, a cutting-blade holding member, a cutting-tool holding member and a workpiece holding member each of which is commonly made of a steel, brass or other material having a high degree of electric conductivity. However, a fixing device, which is provided for fixing the members positioned on respective opposite sides of the resistive layer, has to be adapted to firmly fix the members relative to the resistive layer while preventing the members from having an electrical continuity with each other. If the resistive layer has a function of bonding the members to the layer itself, the provision of the fixing device is not necessary.

(23) An apparatus according to any one of modes (19)–(21), wherein the resistance consists of a resistor including a resistive body and a pair of terminals which are respectively disposed in opposite ends of the resistive body.

It is relatively difficult to adjust the electric resistance acting on the second circuit to accurately have a desired value, by using the resistive layer defined in the mode (23), due to the arrangement in which the resistive layer is held in contact at wide surfaces thereof with the members positioned on the respective opposite sides of the resistive layer. The value of the electric resistance provided by the resistive layer is likely to be changed depending upon an area of each of the contact surfaces of the layer. However, the resistor defined in this mode (23) makes it easy to adapt the electric resistance acting on the second circuit to accurately have a desired value.

(24) An apparatus according to any one of modes (19), (20) and (23), wherein the resistance is built in one of a cutting tool which includes at least the cutting blade, and a tool holding member which holds the cutting tool.

In general, cutting tools can be classified into two types. A cutting tool of one of the two types is constituted by a main body and a cutting blade in the form of a replaceable cutting insert which is removably fixed to the main body. Another type of cutting tool, which is commonly called a solid tool, is constituted by a single piece whose entirety can be considered to correspond to a cutting blade. A cutting tool constituted by a main body and a cutting blade in the form of an insert or tip which is fixedly welded or brazed to the main body could be interpreted to correspond to the above-described one type. However, for the sake of explanation, such a cutting tool having a brazed tip is defined as a kind of solid tool, namely, interpreted to correspond to the above-described another type in the descriptions of this specification. Therefore, in the descriptions, the cutting tool including the main body and the cutting blade is interpreted to mean a cutting tool including a main body and a replaceable cutting blade which is removably attached to the main body by suitable clamping means and which cooperates with the main body to constitute the cutting tool.

(25) An apparatus according to mode (21), wherein the resistance consists of a resistor built in one of a workpiece holding member which holds the workpiece, and a component of a main body portion of the machine tool.

(26) An apparatus according to any one of modes (19)–(24), further comprising:

- an insulator which electrically insulates a main body portion of the machine tool, from one of the cutting blade and the workpiece;
- a first conductive passage which is connected at one of opposite ends thereof to the one of the cutting blade and the workpiece, and which is connected at the other of the opposite ends to the power source;
- a second conductive passage which connects the power source to the main body portion of the machine tool;
- a current detector which detects an electric current flowing through the first circuit that includes the first and second conductive passages; and a third conductive passage which connects the one of the cutting blade and the workpiece, to the main body portion of the machine tool via the resistance, the third conductive passage being included in the second circuit, wherein the third conductive passage is shorter than the first conductive passage.

The length of the first conductive passage can be reduced by disposing the power source in the vicinity of the cutting blade. The reduction of the length of the first conductive passage makes it possible to form the first conductive passage with a conductive member having a reduced length, thereby reducing a risk of disconnection or damage of the conductive member. However, in general, the first conductive passage requires to have a certain degree of length, because of a difficulty of disposing the power source and the detector in the vicinity of the cutting blade, or because of necessity of disposing the power source and the detector in positions distant from the cutting blade in the interest of minimizing splashing of the cutting fluid and cutting chips over the power source and the detector which can be easily damaged. That is, for these reasons, it is not easy to reduce the length of the first conductive passage. On the other hand, the third conductive passage can be easily adapted to have a small length, since the resistance provided in the third conductive passage is not easily damaged by the splashing of the cutting fluid and cutting chips. In the event of damage or disconnection of the third conductive passage, the control device determines that the electric power, the detector or the first conductive passage is not in a normal condition even if each of these components is actually in the normal condition, and accordingly inhibit the movement device from carrying out the relative movement of the cutting blade and the object toward each other. In this sense, it is preferable to minimize the length of the third conductive passage, for reducing a possibility of the damage or disconnection of the third conductive passage.

(27) An apparatus according to mode (26), wherein the resistance consists of a resistor including a resistive body and a pair of terminals which are respectively disposed in opposite ends of the resistive body, and wherein the resistor and the third conductive passage are built in one of a cutting tool which includes at least the cutting blade, and a tool holding member which holds the cutting tool.

In the apparatus of this mode (27) in which the third conductive passage, as well as the resistor, is built in one of the cutting tool and the tool holding member, the third conductive passage is protected by the one of the cutting tool and the tool holding member, thereby avoiding a risk of the damage or disconnection of the third conductive passage. The mode (28) described blow provides substantially the same technical advantage.

(28) An apparatus according to mode (26), wherein the resistance consists of a resistor including a resistive body and a pair of terminals which are respectively disposed in opposite ends of the resistive body, and wherein the resistor and the third conductive passage are built in one of a workpiece holding member which holds the workpiece, and a component of a main body portion of the machine tool.

(29) An apparatus according to any one of modes (19)–(28), wherein the resistance of the second circuit is connected between two members, and wherein at least one of the two members is covered, at at least a portion of a surface thereof which portion is adjacent to a surface of the other of the two members, with an insulating layer which is made of an electrically insulating material.

(30) An apparatus according to any one of modes (19)–(29), further comprising:

a touch probe which is provided to be unmovable relative to the cutting blade, and;

an on-off circuit which includes an object and the touch probe arranged in series to each other and which is connected to a power source, the on-off circuit being closed when the touch probe and the object are in contact with each other, while being open when the touch probe and the object are not in contact with each other.

At least one of the object and the power source which are recited in this mode (30) may be provided by the object and/or the power source which are recited in the above-described modes, or alternately, may be provided by another object and/or another power source. It is noted that the apparatus of this mode (30) may further include (a) a movement device which moves the touch probe and the cutting blade relative to the workpiece, and/or which moves the workpiece relative to the touch probe and the cutting blade, (b) a third circuit which includes a resistance and which is connected in parallel with said on-off circuit, said third circuit being closed irrespective of whether said touch probe and said object are in contact with each other or not, (c) a power source detector which detects a state of said power source; and (d) a control device which commands said movement device to move said touch probe and said object relative to each other if each of said power source and said power source detector is indicated normal by said power source detector when said on-off circuit is open, said control device controlling said movement device on the basis of said relative position of said touch probe and said object which is detected by said movement device when said state of said power source detected by said power source detector indicates transition from an open state in which said on-off circuit is open, to a closed state in which said on-off circuit is closed.

(31) An apparatus according to any one of modes (19)–(30), wherein the control device determines that the cutting blade and the object are actually brought into contact with each other when a predetermined first condition is satisfied, and wherein the predetermined first condition is different from a predetermined second condition which is required to determine that the cutting blade and the object are spaced apart from each other and are shorted to each other by a cutting fluid, so that an actual contact of the cutting blade and the object is distinguishable from a short of the cutting blade and the object by the cutting fluid.

(32) An apparatus according to any one of modes (19)–(31), wherein the control device include a breakage determining portion which determines that there is a possibility that the cutting blade has been damaged, if the contact of the cutting blade and the object is not detected while the relative position detected by the movement device satisfies a positional condition required for the contact of the cutting blade and the object.

(33) An apparatus according to any one of modes (18)–(32), wherein the cutting blade is held by a blade holding member, and wherein the cutting blade and the object are brought into contact with each other while a conductive layer having an electrical conductivity is provided in at least one of a space between the cutting blade and the blade holding member, and a space between the cutting blade and the object.

The apparatus defined in each of the above-described modes (18)–(32) can be carried out together with any one or any combinations of cutting blades defined in modes (51)–(57), a master workpiece defined in mode (58), and a conductive sheet defined in mode (59), which are described below.

The method or apparatus defined in each of the above-described modes (1)–(33) can be carried out together with any one or any combinations of method, cutting blade, master workpiece, or conductive sheet defined in each of the following modes (34)–(59).

(34) A method of detecting contact and separation of a cutting blade held by a blade holding member, with and from an object, on the basis of a change of a state of an electric circuit which is changed depending upon whether the cutting blade is in contact with the object or is separated from the object, the method comprising:

a step of bringing the cutting blade and the object into contact with each other, while a conductive layer having an electrical conductivity is provided in at least one of a space between the cutting blade and the blade holding member, and a space between the cutting blade and the object.

The conductive layer, which is interposed between the cutting blade and the blade holding member and/or between the cutting blade and the object, for example, may take the form of a conductive coating bonded to a surface of the cutting blade, the blade holding member or the object; a local conductive coating bonded to a local portion of the cutting blade such as a portion including a cutting edge and an adjacent part adjacent to the cutting edge; or a conductive sheet.

With the provision of the conductive layer between the cutting blade and the object, the cutting blade and the object are brought into contact with each other, necessarily through the conductive layer interposed therebetween. The conductive layer does not impede the detection of the contact of the cutting blade and the object, and advantageously eliminates a risk of chipping of the cutting blade and a risk of damage or undesirable cut of the object, which might be caused where the cutting blade and the object are contacted directly with each other. It is considered that the "indirect" contact position in which the two members are contacted with each other through the conductive layer is offset from a "direct" contact position in which the two members are contacted directly with each other, by an amount corresponding to a thickness of the conductive layer. However, where the thickness of the conductive layer is small enough to satisfy a required machining accuracy, the indirect contact position can be taken as the direct contact position. Where the thickness of the conductive layer is not small enough, a position offset from the indirect contact position by the amount corresponding to the thickness of the conductive layer can be taken as the direct position.

Where the conductive coating is bonded to one of the cutting blade and the object which are provided by respective conductive members each having a high degree of electrical conductivity, the conductive coating can be advantageously made of a soft or brittle material, or alternatively made of a material having a predetermined degree of electric resistance. In the former case, it is preferable that the conductive coating is constructed such that a portion of the conductive coating which portion covers a cutting edge and its adjacent portion of the cutting blade is destroyed rapidly upon initiation of a cutting operation. In this case, the conductive coating formed on the cutting blade is brought into contact with the workpiece shortly before the initiation of cutting of the workpiece with the cutting blade, so that the contact of the conductive coating with the workpiece is detected before cutting blade starts to cut the workpiece. However, it is not desirable that a portion of the conductive coating covering cutting edge or edges not currently serving to cut the workpiece is destroyed due to contact of such a portion of the coating with cutting chips or other substances. For preventing such a destruction of the portion of the coating which cover the currently unused cutting edge or edges, it is preferable that a degree of strength of the conductive coating is held in a predetermined range. In the latter case, i.e., where the conductive coating is made of a material having a predetermined degree of electric resistance, it is possible to avoid flow of an excessively high amount of electric current through contact portions of the cutting blade and the object at which the two members are brought into contact with each other. In this sense, the conductive coating made of the resistive material can be considered as a kind of electrically resistive coating.

The conductive coating covering the cutting edge and its adjacent portion may be made of a material, which is selected among a plurality of materials having respective electric resistance values different from each other, depending upon kind of the cutting blade. In this arrangement, an amount of change in value of an electric current or an electric resistance representative of the state of the electric circuit upon the contact of the cutting blade with the object varies depending upon the kind of the cutting blade. It is accordingly possible to identify the kind of the cutting blade on the basis of the amount of change in the value of the electric current flowing through the electric circuit, or on the basis of the amount of change in the value of the electric resistance acting on the electric circuit. For example, the amount of change in value of the electric current or resistance can be detected by a suitable detector so that the detected amount of change is compared with a predetermined amount of change corresponding to a correct cutting blade, i.e., a cutting blade designated in a cutting operation program. If the detected amount of change is different from the predetermined amount of change, it is determined that the cutting blade which has been brought into contact with the object is not the correct cutting blade, namely, it is determined that the cutting blade in question is a wrong cutting blade which has been attached to the blade holding member by mistake. Such an identification of the cutting tool can be made by comparing the value itself of the electric current or resistance in stead of the amount of change in value of the electric current or resistance. That is, irrespective of whether the amount of change in the value or the value itself is checked, it is possible to determine if the cutting blade attached to the blade holding member and brought into contact with the object is a currently required cutting blade or not, simply by detecting or measuring the value of the electric current or resistance in the electric circuit including, for example, the object, the conductive layer, the cutting blade and the blade holding member which are arranged in series. In this arrangement, it is important that the material forming the conductive layer has a suitable resistance value. In this sense, the conductive coating can be considered as a kind of electrically resistive coating.

Where at least a contact portion of one of the cutting blade and the object at which portion the one of the two members is brought into contact with the other is made of an electrically insulating material, the conductive layer is formed to cover at least the contact portion. This arrangement is effective to provide the electrically insulating contact portion with an electric conductivity, as well as a resistance to chipping or damage of the cutting blade. For example, where the cutting blade is provided by a cutting insert made of a ceramic material which has a high degree of electric resistance or does not have an electric conductivity, such a ceramic cutting insert may be covered at its entirety with a conductive layer so that the ceramic cutting insert can be used as a conductive cutting insert having a high degree of electric conductivity. Where a rake face (which cooperates with a flank face adjacent to the rake face, to define a cutting edge or point at an intersection of the rake and flank faces) of the cutting blade is covered with a diamond sintered body or CBN (cubic boron nitrides) sintered body, such a sintered body and its adjacent portion may be covered with a conductive layer so that contact of a cutting point of the cutting blade with the object can be detected. In this arrangement, it is important that the material forming the conductive layer has a sufficient degree of electric conductivity. However, the conductive layer can be adapted to have a predetermined electric resistance value in addition to the sufficient degree of electric conductivity, if needed.

Further, the conductive layer may be provided in the space between the cutting blade and the blade holding member, in addition to or in place of the space between the cutting blade and the object. For example, where the conductive layer is interposed between the cutting blade and the blade holding member both of which have a high degree of electrical conductivity, a contact of the cutting blade and the object provides a change in the state of the electric circuit. Such a change in the state of the electric circuit upon the contact of the two members is influenced by the conductive layer. Where the electric circuit is constructed such that an electric current flows through the conductive layer, as described below in mode (36), a value of the electric current flowing through the conductive layer varies depending upon a surface area of the conductive layer, particularly, if the conductive layer is made of a material having a high degree of electric resistance. Therefore, it is possible to determine whether or not the cutting blade brought into contact with the object is a correct cutting blade, namely, whether or not the cutting blade currently attached in the blade holding member is a currently required blade in accordance with a cutting operation program. Still further, the conductive layer may be formed on a contact surface of the cutting blade which is held in contact with the blade holding member such that a value of electric resistance of the conductive layer is different from that of a conductive layer that is formed on other cutting tool. This arrangement permits the amount of change in the state of the electric circuit upon the contact, to vary from cutting blade to cutting blade, thereby making it possible to identify the cutting tool actually brought into contact with the object and accordingly to determine whether or not the cutting blade currently attached in the blade holding member is a currently required blade in accordance with a cutting operation program.

(35) A method according to mode (34), wherein the contact and the separation are detected on the basis of transition from an open state in which an on-off circuit as the electric circuit is open, to a closed state in which the on-off circuit is closed, and wherein the on-off circuit includes at least the cutting blade, the object and a power source which are arranged in series to each other, the on-off circuit being open when the cutting blade is separated from the object while being closed when the cutting blade is in contact with the object.

The method of this mode (35) can be advantageously practiced, particularly, where the cutting blade constitutes the entirety of a cutting tool, namely, where the cutting tool consists of a solid tool.

(36) A method according to mode (34), wherein the contact and the separation are detected on the basis of transition from an open state in which an on-off circuit is open, to a closed state in which the on-off circuit is closed, and wherein the on-off circuit includes at least the blade holding member, the cutting blade, the object and a power source which are arranged in series to each other, the on-off circuit being open when the cutting blade is separated from the object while being closed when the cutting blade is in contact with the object.

The method of this mode (36) can be advantageously practiced, particularly, where the cutting blade constitutes a portion of a cutting tool, namely, where the cutting tool includes a main body to which the cutting blade is removably attached. That is, this method can be advantageously, for example, where the cutting blade is provided by a replaceable cutting insert which is replaceably attached to a main body of a cutting tool designed for a turning (lathe), milling, drilling, reaming, boring or other cutting operation.

(37) A method according to any one of modes (34)–(36), wherein the conductive layer consists of a conductive coating which covers a surface of the cutting blade.

The conductive layer may take the form of the conductive coating covering the surface of the cutting blade. This arrangement facilitates the interposition of the conductive layer between the cutting blade and the blade holding member, or between the cutting blade and the object. For example, by covering all the surface of the cutting blade with the conductive coating, the conductive layer can be easily interposed between the cutting blade and the blade holding member and at the same time between the cutting blade and the object. However, the conductive coating does not have to cover necessarily all the surface of the cutting blade, but may cover only the cutting edge and its adjacent portion of the cutting blade, or alternatively, only at least a portion of a contact surface of the cutting blade at which surface the cutting blade is held in contact with the blade holding member, irrespective of whether the cutting blade is of a lathe cutting tool or of a rotary cutting tool.

(38) A method according to any one of modes (35)–(37), wherein the conductive layer consists of a conductive coating which covers a contact surface of the object which surface is in contact with the cutting blade.

This arrangement in which the conductive coating covers the object in stead of the cutting blade also facilitates the interposition of the conductive layer between the cutting blade and the object.

(39) A method according to mode (38), wherein the object consists of a master workpiece which has a known dimension and which is held by a workpiece holding device that is provided for holding a workpiece to be cut by the cutting blade.

(40) A method according to mode (35) or (36), wherein the conductive layer consists of a conductive sheet which is positioned to be interposed between the cutting blade and the object when the cutting blade and the object are in contact with each other.

The use of the conductive sheet makes it possible to interpose the conductive layer between the cutting blade and the object, even where neither the cutting blade nor the object is covered with the conductive layer or coating.

(41) A method according to any one of modes (34)–(36), wherein the cutting blade is provided by at least a cutting edge of a rotary cutting tool which is to be rotated about an axis thereof for cutting a workpiece, and an adjacent portion of the rotary cutting tool which portion is adjacent to the cutting edge, wherein the cutting edge and the adjacent portion is covered with a conductive coating as the conductive layer, and wherein the rotary cutting tool is brought into contact with the object while the rotary cutting tool is being rotated.

The cutting blade may constitute the entirety of the cutting tool, or may cooperate with the main body to constitute the cutting tool. In the later case, the cutting blade may take the form of a replaceable cutting blade which is removably attached to the main body. In either of these cases, the contact of the rotary cutting tool and the object can be detected without necessity of bringing the cutting edge of the tool into direct contact with the object.

(42) A method according to mode (41), wherein the rotary cutting tool is brought into contact with the object while the rotary cutting tool is being rotated at a velocity substantially equal to that at which the rotary cutting tool is rotated in a cutting operation for cutting the workpiece.

The method of this mode (42) makes it possible to accurately detect the contact position in which the rotary cutting tool and the object are brought into contact with each other, even where the cutting tool has a plurality of cutting edges whose respective radial distances from the rotary axis are different from each other. In other words, this method makes it possible to determine, as the contact position, the relative position in which the object is brought into contact with one of the cutting edges which has a larger radial distance from the rotary axis than the other cutting edges. Further, since the velocity at which the cutting tool is rotated as it is brought into contact with the object is adapted to substantially equal to the velocity at which the cutting tool is rotated in the cutting operation, the contact position is detected under the same conditions (e.g., vibrations caused by the rotation of the cutting tool) as in the cutting operation. Therefore, the control of the relative movement of the cutting blade and the workpiece on the basis of the contact position which is obtained in this method provides a further improvement in the dimensional accuracy of the product.

(43) A method according to any one of modes (34)–(36), wherein the conductive layer consists of a resistive coating which covers at least a cutting edge of the cutting blade and an adjacent portion of the cutting blade which portion is adjacent to the cutting edge, the method further comprising:

a cutting-blade identifying step of determining that the cutting blade is a currently required cutting blade if the state of the electric circuit satisfies a predetermined condition when the cutting blade is in contact with the object via the resistive coating, and determining that the cutting blade is not the currently required cutting blade if the state of the electric circuit does not satisfy the predetermined condition when the cutting blade is in contact with the object via the resistive coating, the predetermined condition including at least one of a current-value-related requirement that a value of electric current flowing through the electric circuit upon contact of the cutting blade with the object via the resistive coating is held in a predetermined range, and a resistance-value-related requirement that a value of electric resistance acting on the electric circuit upon the contact is held in a predetermined range.

(44) A method according to any one of modes (34)–(36), wherein the conductive layer consists of a resistive coating which covers at least a contact surface of the cutting blade that is held in contact with the blade holding member, the method further comprising:

a cutting-blade identifying step of determining that the cutting blade is a currently required cutting blade if the state of the electric circuit satisfies a predetermined condition when the cutting blade is in contact with the object via the resistive coating, and determining that the cutting blade is not the currently required cutting blade if the state of the electric circuit does not satisfy the predetermined condition when the cutting blade is in contact with the object via the resistive coating, the predetermined condition including at least one of a current-value-related requirement that a value of electric current flowing through the electric circuit upon contact of the cutting blade with the object via the resistive coating is held in a predetermined range, and a resistance-value-related requirement that a value of electric resistance acting on the electric circuit upon the contact is held in a predetermined range.

(45) A method according to any one of modes (34)–(36), wherein the cutting blade held by the blade holding member includes a cutting edge, an adjacent portion adjacent to the cutting edge and a contact surface held in contact with the blade holding member, and wherein at least the cutting edge, the adjacent portion and the contact surface of the cutting blade are covered with a conductive coating as the conductive layer, the method further comprising:

a moving step of moving at least one of the cutting blade and the object toward each other such that the cutting edge is brought into contact with the object via the conductive coating;

a memorizing step of memorizing, as a contact position, a relative position of the cutting blade and the object upon contact of the cutting edge with the object via the conductive coating;

a movement-controlling step of controlling a relative movement of the cutting blade and a workpiece which is to be cut by the cutting blade, on the basis of the contact position memorized in the memorizing step; and a cutting-blade identifying step of determining that the cutting blade is not a currently required cutting blade if the state of the electric circuit including the workpiece, the cutting blade and the blade holding member which are arranged in series to each other, does not satisfy a predetermined condition when the conductive coating covering the cutting edge is destroyed due to contact of the cutting blade with the workpiece as a result of the relative movement of the cutting blade and the workpiece, wherein the predetermined condition includes at least one of a current-value-related requirement that a value of electric current flowing through the electric circuit upon destruction of the conductive coating is held in a predetermined range, and a resistance-value-related requirement that a value of electric resistance acting on the electric circuit upon destruction of the conductive coating is held in a predetermined range, the predetermined condition being determined to be not satisfied if the above-described at least one of the current-value-related requirement and the resistance-value-related requirement is not satisfied.

In the method of this mode (45) in which the relative position of the cutting blade and the object upon the contact of the two members via the conductive coating is taken as the contact position, the contact position can be detected without the object being undesirably cut by the cutting blade. Further, when the cutting blade is brought into direct contact with the workpiece as the result of the destruction of the conduct coating caused by the relative movement of the cutting blade and the workpiece toward each other, at least one of the values of the electric resistance and the electric current in the electric circuit is detected, so that it is determined that the cutting blade in question is not a currently required cutting blade if the detected value or values is not in the predetermined range or ranges.

(46) A method according to mode (45), wherein the object consists of the workpiece which is to be cut by the cutting blade.

In the method of this mode (46) in which the workpiece is used as the object, the detection of the contact position and the determination as to whether the cutting blade is a current required cutting blade or not can be made in an initial stage of the cutting operation.

(47) A method of identifying a plurality of cutting blades each including a cutting edge and an adjacent portion which is adjacent to the cutting edge, comprising:

a covering step of covering at least the cutting edge and the adjacent portion of each of the cutting blades with a resistive coating made of a material, which is selected among a plurality of materials having respective electric resistance values different from each other, depending upon kind of each of the cutting blades;

a blade setting step of setting one of the cutting blades in a blade holding member such that the one of the cutting blades is held by the blade holding member, for thereby forming an electric circuit including the one cutting blade, the blade holding member and an object which is contactable with and separable away from the cutting blade and which is arranged in series with the one cutting blade and the blade holding member; and a blade identifying step of identifying kind of the one cutting blade which is currently held by the blade holding member, on the basis of a state of the electric circuit when the cutting edge of the cutting blade is in contact with the object via the resistive coating.

(48) A method of identifying a plurality of cutting blades each including a cutting edge and a contact surface which is held in contact with a blade holding member, comprising:

a covering step of covering at least the contact surface of each of the cutting blades with a resistive coating made of a material, which is selected among a plurality of materials having respective electric resistance values different from each other, depending upon kind of each of the cutting blades;

a blade setting step of setting one of the cutting blades in a blade holding member such that the one of the cutting blades is held at the contact surface by the blade holding member, for thereby forming an electric circuit including the one cutting blade, the blade holding member and an object which is contactable with and separable away from the cutting blade and which is arranged in series with the one cutting blade and the blade holding member; and a blade identifying step of identifying kind of the one cutting blade which is currently held by the blade holding member, on the basis of a state of the electric circuit when the cutting edge of the cutting blade is in contact with the object.

The resistive coating may be adapted to cover the entire surface of the cutting blade, so that the cutting blade can be applied to the method defined in the above-described mode (47). However, it is preferable that a portion of the cutting blade which portion is brought into contact with the object is not covered with the resistive coating, for facilitating identification of the cutting blade. This is because, as described below in the DETAILED DESCRIPTION OF THE PREFERRED EMBODIMENTS, an electric resistance acting on a portion between the cutting blade and the object is likely to be considerably larger than that acting on a portion between the cutting blade and the blade holding member, and this relatively large electric resistance acting on the former portion makes the identification of the cutting blade difficult.

(49) A method according to mode (47) or (48), wherein the state of the electric circuit is represented by at least one of a value of electric current flowing through the electric circuit, and a value of electric resistance acting on the electric circuit.

(50) A method according to mode (49), further comprising a blade-selection checking step of determining that the one cutting blade is a currently required cutting blade if a predetermined condition is satisfied, and determining that the one cutting blade is not the currently required cutting blade if the predetermined condition is not satisfied, wherein the predetermined condition includes at least one of a current-value-related requirement that the value of the electric current is held in a predetermined range, and a resistance-value-related requirement that the value of the electric resistance is held in a predetermined range.

(51) A cutting blade which is removably held by a blade holding member, for thereby cutting a workpiece, the cutting blade being covered at at least a portion of a surface thereof with a conductive coating having an electrical conductivity.

(52) A cutting blade according to mode (51), wherein the conductive coating is made of a material whose electric resistance is larger than that of a material of the cutting blade.

(53) A cutting blade according to mode (51), wherein the conductive coating is made of a material whose electric resistance is smaller than that of a material of the cutting blade.

(54) A cutting blade according to any one of modes (51)–(53), being covered at all the surface with the conductive coating.

(55) A cutting blade according to any one of modes (51)–(54), consisting of a replaceable cutting insert which is replaceably attached to a main body of a cutting tool, the main body including a shank portion and cooperating with the replaceable cutting insert to constitute the cutting tool.

(56) A cutting blade according to any one of modes (51)–(56), consisting of a cutting edge of a rotary cutting tool, and an adjacent portion of the rotary cutting tool which portion is adjacent to the cutting edge, the rotary cutting tool being rotated about an axis thereof for achieving a cutting operation.

(57) A cutting blade according to mode (56), wherein the cutting edge and the adjacent portion are provided by a replaceable cutting insert which is replaceably attached to a main body of the rotary cutting tool, the main body including a shank portion and cooperating with the replaceable cutting insert to constitute the rotary cutting tool.

(58) A master workpiece which is to be held by a workpiece holding device serving for holding a workpiece to be cut by a cutting blade, and which is to be brought into contact with the cutting blade, the master workpiece having a known dimension and covered at a surface thereof with a conductive coating which has an electrical conductivity.

(59) A conductive sheet consisting of a sheet member which is made a material having an electrical conductivity.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
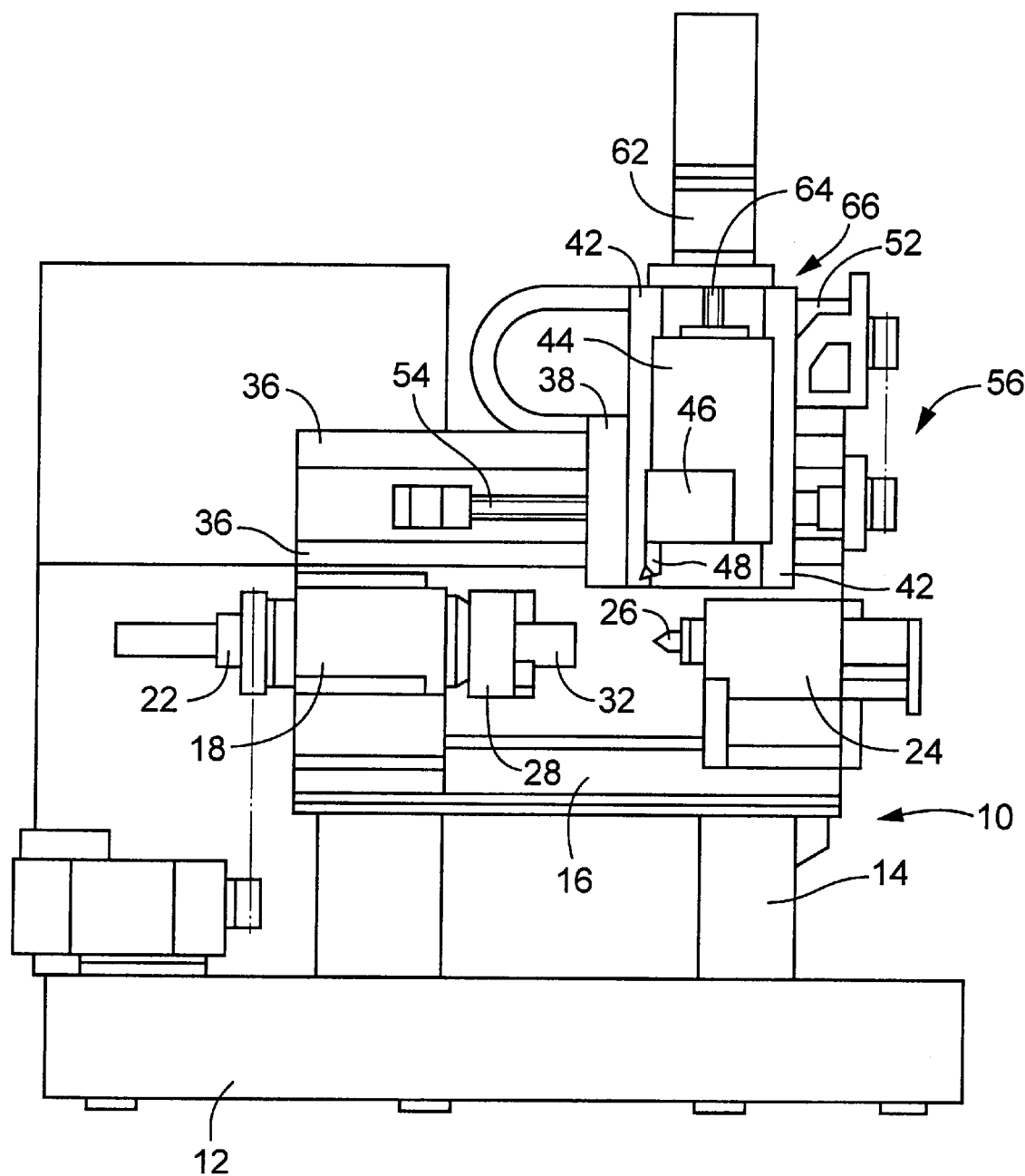
FIG. 1 is a front view of a NC lathe which is equipped with a cutting-blade-position controlling apparatus constructed according to a first embodiment of the invention.

Referring first to FIGS. 1–4, there will be described a cutting-blade-position controlling apparatus which is constructed according to a first embodiment of this invention. This cutting-blade-position controlling apparatus is built in a NC (numerically controlled) lathe which is principally constituted by a main structure 10. The main structure 10 includes a base 12, a column 14 which extends upwardly from the base 12, and a bed 16 and a headstock 18 which are attached to a vertically intermediate portion of the column 14. The headstock 18 holds a main spindle 22 such that the main spindle 22 is rotatable about its rotary axis and is unmovable in its axial direction. A tailstock 24 is disposed on the bed 16 such that the tailstock 24 is movable toward and away from the headstock 18. The tailstock 24 holds a tail center 26 such that tail center 26 is opposed to and coaxial with the main spindle 22. A workpiece holding member in the form of a three-jaw universal chuck 28 is attached to the main spindle 22. A workpiece 32, which is to be machined or cut in the NC lathe, is held at its axial end portion by this chuck 28 so as to be rotatable with the chuck 28, or alternately, the workpiece 32 may be held at its axially opposite end portions by the chuck 28 and the tail center 26 so as to be rotatable with the chuck 28 and the tail center 26. In the latter case, the chuck 28 may be replaced with a main center (not shown) which is attached, in place of the chuck 28, to the main spindle 22, so that the workpiece 32 is held at its axially opposite end portions by the main center and the tail center 26.

The NC lathe includes a Z-axis guide 36 which is attached to an upper portion of the column 14 and which extends in a Z-axis direction that is parallel to the rotary axis of the main spindle 22; and a carriage 38 which is held by the Z-axis guide 36 and which is movable in the Z-axis direction. The NC lathe further includes a X-axis guide 42 which is provided in the carriage 38 and which extends in a X-axis direction that is perpendicular to the rotary axis of the main spindle 22; and a cross slide 44 which is held by the X-axis guide 42 and which is movable in the X-axis direction. A cutting-tool holding member in the form of a turret 46 is fixed to cross slide 44. A cutting tool in the form of a lathe cutting tool 48 is attached to the turret 46. The carriage 38 is moved by a Z-axis movement device 56 which includes a Z-axis motor 52 and a Z-axis feed screw 54, while the cross slide 44 is moved by a X-axis movement device 66 which includes a X-axis motor 62 and a X-axis feed screw 64, so that the turret 46 and the lathe cutting tool 48, which is attached to the turret 46, are moved in the Z-axis and X-axis directions.

Figure 2:
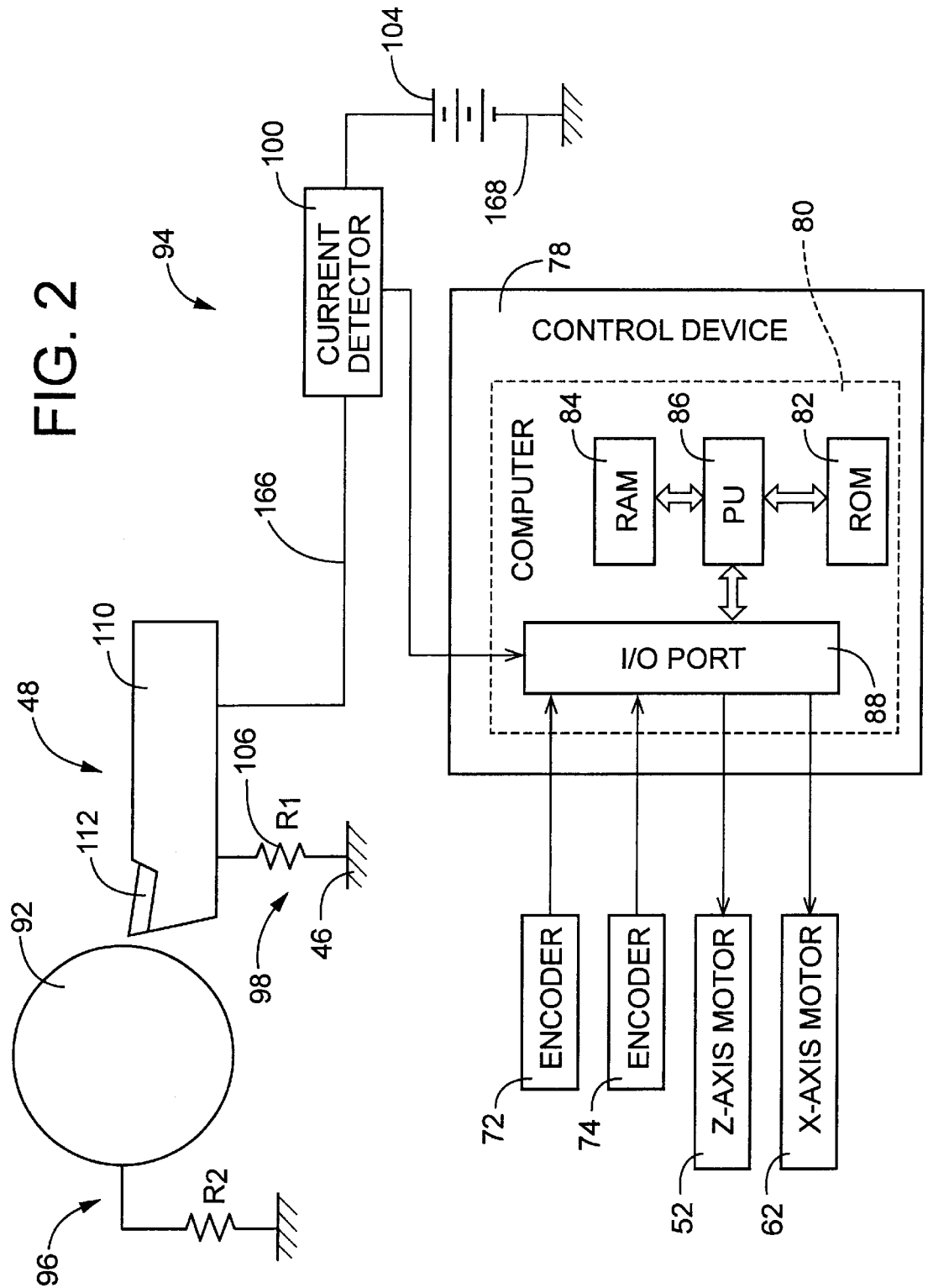
FIG. 2 is a block diagram schematically showing the above-described cutting-blade-position controlling apparatus.

The Z-axis and X-axis motors 52, 62 consist of respective servo motors which are numerically controllable, and are provided with respective rotary encoders 72, 74. These encoders 72, 74 are connected to a control device 78 as shown in FIG. 2, so that the control device 78 calculates a position of the turret 46 or the cutting tool 48 (which is moved by the movement devices 56, 66) relative to the headstock 18 or the chuck 28, on the basis of outputs provided by the encoders 72, 74. That is, the position of the turret 46 or the cutting tool 48 in the Z-axis and X-axis directions is controlled in a feed-back manner. The control device 78 is principally constituted by a computer 80, and includes, in addition to the computer 80, a driving circuit for driving motors such as the Z-axis and X-axis motors 52, 62, and a converting circuit for converting various outputs into digital data which can be inputted to the computer 80. The computer 80 includes a ROM (read-only memory) 82, a RAM (random-access memory) 84, a PU (processing unit) 86 and I/O port 88. A cutting operation program for cutting the workpiece 32 is stored in the ROM 82.

A contact detecting circuit 94 for detecting a contact of the cutting tool 48 with a master workpiece 92 is provided to be connected to the control device 78. The contact detecting circuit 94 includes a first circuit 96, a second circuit 98 and an electric current detector 100. The first circuit 96, in which the cutting tool 48, the master workpiece 92 and a DC power source 104 are arranged in series with each other, is closed when the cutting tool 48 and the master workpiece 92 are in contact with each other, and is open when the cutting tool 48 and the master workpiece 92 are not in contact with each other. The master workpiece 92 has a diameter substantially identical to a desired diameter of a product which is to be formed from the workpiece 32. The master workpiece 92 is attached to the chuck 28, to which the workpiece 32 is to be attached in a cutting operation. The second circuit 98 is connected, in parallel with the first circuit 96, to the DC power source 104, and includes an electric resistance in the form of a fixed resistor 106. The second circuit 98 is held closed irrespective of whether the cutting tool 48 and the master workpiece 92 are in contact with each other or not. The current detector 100 is a kind of a detector for detecting a state of the DC power source 104, and is adapted to detect an electric current flowing from the DC power source 104 toward the first and second circuits 96, 98.

Figure 3:
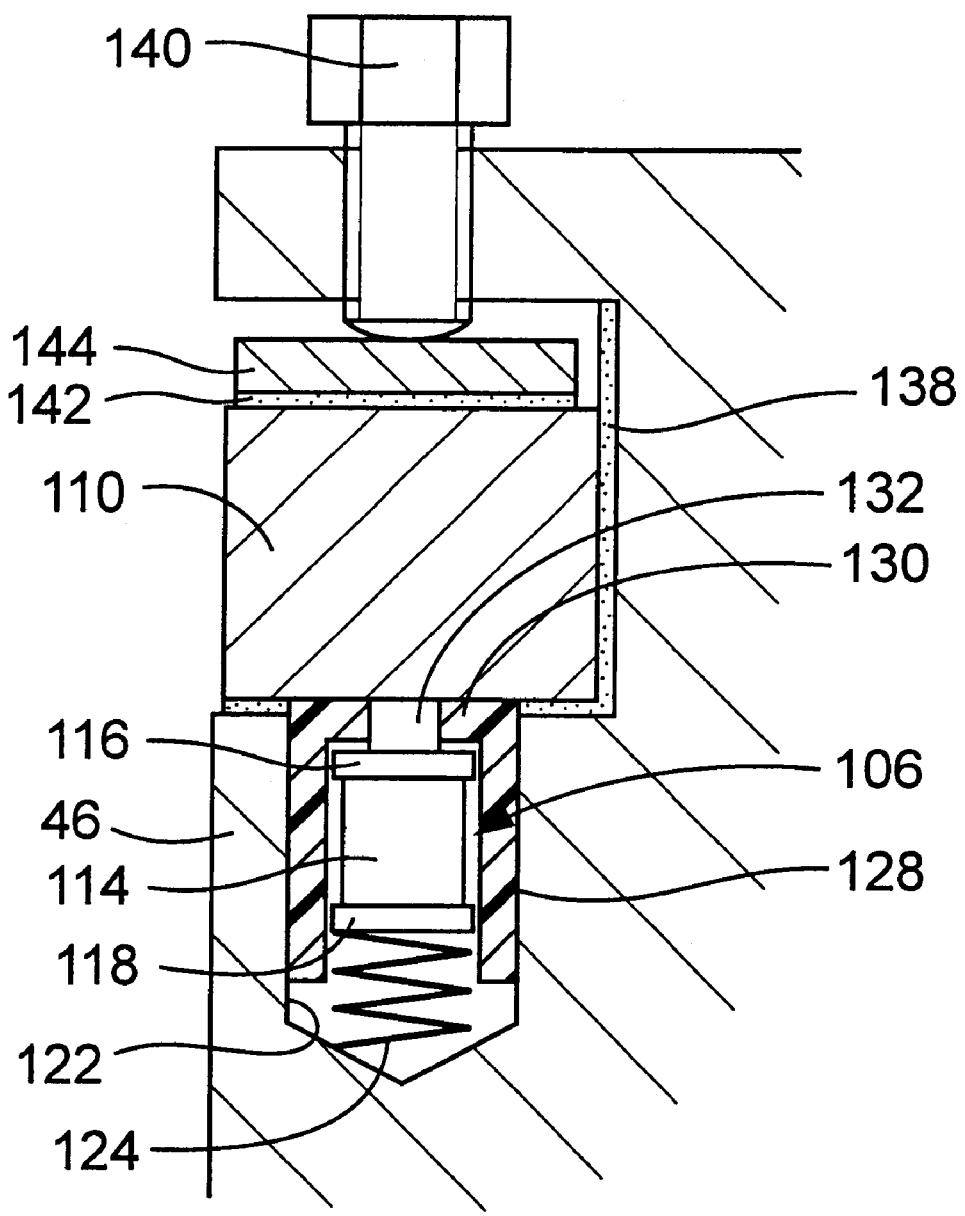
FIG. 3 is a cross sectional view showing a part of the above-described cutting-blade-position controlling apparatus.
Figure 4:
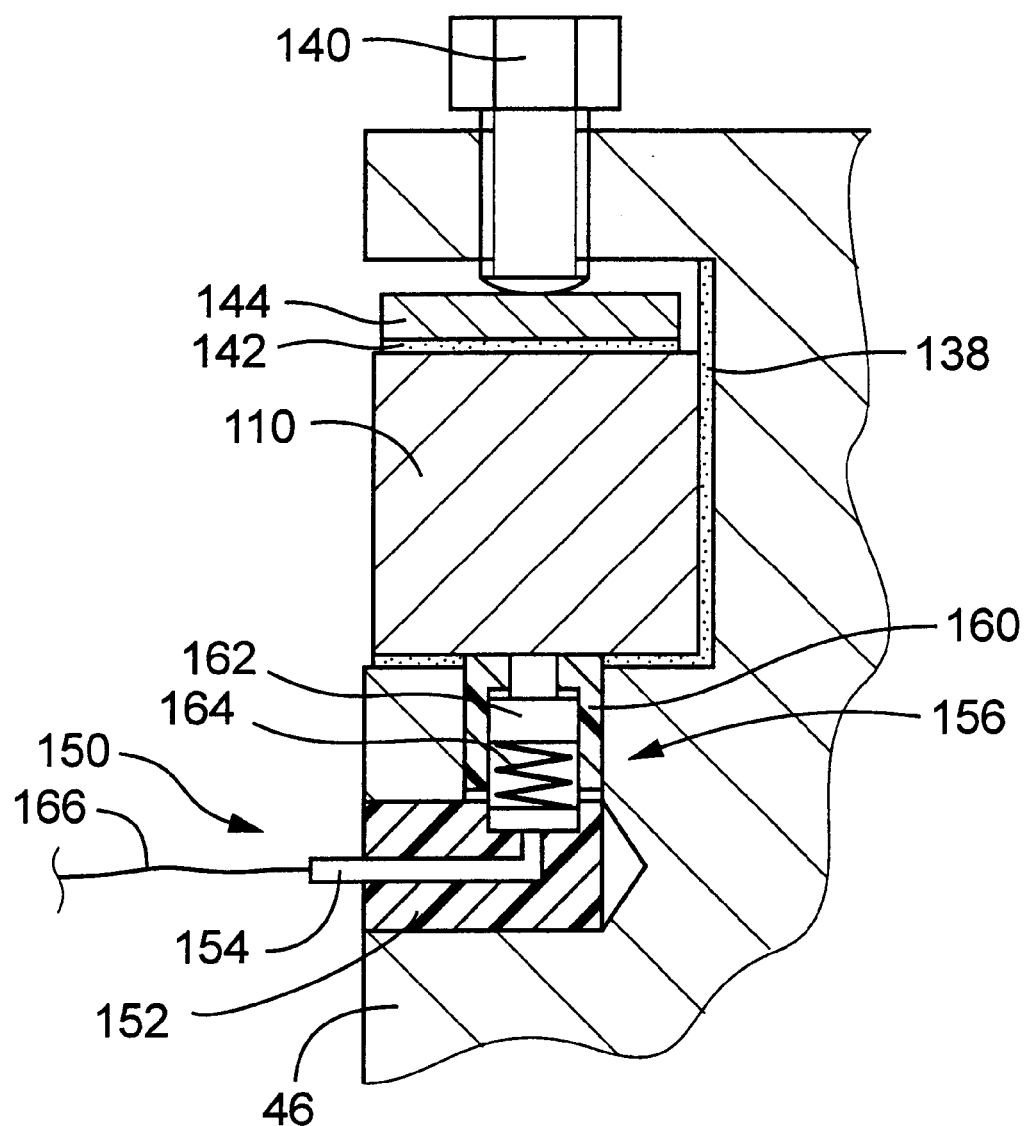
FIG. 4 is a cross sectional view showing a another part of the above-described cutting-blade-position controlling apparatus.

As shown in FIG. 2, the cutting tool 48 includes a main body in the form of a tool body 110, and a cutting blade in the form of a replaceable cutting insert 112 which is attached to the tool body 110 by clamping means (not shown). The fixed resistor 106 is disposed between the cutting insert 112 and a main body portion of the NC lathe, namely, between the tool body 110 and the turret 46, as shown in FIG. 3. The fixed resistor 106 includes an electric resistive body 114 and a pair of terminals 116, 118 which are respectively disposed in opposite ends of the resistive body 114. The fixed resistor 106 and a compression coil spring 124, which is a kind of elastic member, are accommodated in an accommodating cavity 122 formed in the turret 46.

The fixed resistor 106 and the coil spring 124 are received in a generally cylindrical housing 128 which is made of an electrically insulating material, such that the resistor 106 is movable relative to the cylindrical housing 128 in an axial direction of the cylindrical housing 128. The cylindrical housing 128 is press-fitted in the accommodating cavity 122 so that the resistor 106 and the coil spring 124 are held in the cavity 122. In an example illustrated by FIG. 3, the cavity 122 has a bottom while the cylindrical housing 128 has openings in its axially opposite ends. An inward flange 130 is provided in one of the axially opposite opening ends of the housing 128, and extends radially inwardly from a cylindrical wall of the housing 128. The housing 128 is fitted in the cavity 122 such that the axial opening end in which the inward flange 130 is provided is positioned in an opening end portion of the cavity 122. In this arrangement, the coil spring 124 is compressed and biases the resistor 106 toward the inward flange 130. A protrusion 132 is provided to protrude from a central portion of the terminal 116 of the resistor 106, over a distance which permits the protrusion 132 to protrude outwardly of the inward flange 130 when the resistor 106 is brought into contact with the inward flange 130.

The tool body 110 and the cutting insert 112 of the cutting tool 48 and also the turret 46 are made of respective conductive materials each having a high degree of electrical conductivity, while the tool body 110 and the turret 46 are insulated from each other by electrically insulting members. In the example illustrated by FIG. 3, the insulting members are provided by an insulating layer 138 formed in a contact surface of the turret 46 that is held in contact with the tool body 110, and another insulating layer 142 formed in a surface of a contact plate 144 which is disposed between the tool body 110 and a bolt 140 which is provided to fix the tool body 110 to the turret 46. With the tool body 110 being fixed to the turret 46, the tool body 110 is held brought in contact with the protrusion 132 of the resistor 106, and accordingly forces the resistor 106 toward the bottom of the accommodating cavity 122 against a biasing force of the coil spring 124. In this arrangement, the tool body 110, the resistor 106, the coil spring 124 and the turret 46 are forced to each other. That is, with the cutting tool 48 being fixed to the turret 46, the cutting tool 48 and the turret 46 are electrically connected to each other via a series circuit which is constituted by the resistor 106 and the coil spring 124. It is noted that the insulating layer 138 may be formed in accordance with known methods such as a PVD (physical vapor deposition) method, a CVD (chemical vapor deposition) method and a method of spray-forming a ceramic coating or film.

A connecting portion 150 is provided in the turret 46 to connect the cutting tool 48 to the DC power source 104 while electrically insulating the cutting tool 48 from the turret 46. The connecting portion 150 includes a terminal 154 and an electrical-continuity establishing portion 156. The terminal 154 is fixed to the turret 46 and which is insulated from the turret 46 by an electrically insulating body 152. The electrical-continuity establishing portion 156 includes a housing 160 which is made of an electrically insulating material, a contact member 162 which is held in contact with the tool body 110, and an elastic member in the form of a coil spring 164 which is interposed between the contact member 162 and the terminal 154. In this arrangement, the tool body 110, the contact member 162, the coil spring 164 and the terminal 154 are forced to each other by an elastic force of the coil spring 164, for thereby establishing an electrical continuity between the terminal 154 and the tool body 110 of the cutting tool 48. A lead wire 166 is provided to be connected at one of its opposite ends to the terminal 154. This lead wire 166 passes through the current detector 100, and is connected at the other of its opposite ends to one of two terminals of the DC power source 104. Another lead wire 168 is provided to be connected at one of its opposite ends to the other of the two terminals of the DC power source 104, and connected at the other of its opposite ends to a component of the main body portion of the NC lathe, for example, a component of the main structure 10.

As is clear from the above descriptions, in the present embodiment, the insulating layers 138, 142 constitute an insulator which electrically insulates the cutting insert 112 as a cutting blade from the main body portion of the NC lathe as a machine tool. The contact member 162, the coil spring 164 and the lead wire 166 cooperate to each other to constitute a first conductive passage which is connected at one of its opposite ends to the cutting blade and which is connected at the other of its opposite ends to the power source. The lead wire 168 constitutes a second conductive passage which connects the power source to the main body portion of the machine tool. The coil spring 124 constitutes a third conductive passage which connects the cutting blade to the main body of the machine tool via the fixed resistor 106 as an electric resistance. The third conductive passage provided by the coil spring 124 advantageously has a length much smaller than that of the first conductive passage provided by the contact member 162, the coil spring 164 and the lead wire 166, and is advantageously built in the cutting-tool holding member in the form of the turret 46. Further, the coil spring 124 providing the third conductive passage is advantageously forced, at its opposite ends, onto the fixed resistor 106 and the turret 46 by its own elastic force. These arrangements are effective to minimizing a risk of deteriorating the electrical-continuity between the tool body 110 and the turret 46 which are electrically connected by the coil spring 124, i.e., the third conductive passage.

In the NC lathe equipped with the contact detecting circuit 94 which is constructed as described above, an operation for cutting the workpiece 32 is carried out as follows:

The operation is initiated by attaching the cutting tool 48 and the master workpiece 92 to the turret 46 and the chuck 28, respectively, so that the first and second circuits 96, 98 are formed. Described specifically, the cutting tool 48, the current detector 100, the DC power source 104, the main body portion of the NC lathe and the master workpiece 92 are arranged in series in the first circuit 96, while the cutting tool 48, the current detector 100, the DC power source 104, the main body portion of the NC lathe and the fixed resistor 106 are arranged in series in the second circuit 98. An electric resistance denoted by a sign R1 in FIG. 2 represents an electric resistance acting on the second circuit 98 Thus, the electric resistance R1 actually includes not only the fixed resistor 106 but also an electric resistance provided by the turret 46 and other parts of the main body portion of the NC lathe. However, the electric resistance R1 may be interpreted to represent the fixed resistor 106, since the electric resistance provided by the main body portion of the NC lathe has a considerably small resistance value. It is preferable that the fixed resistor 106 has a resistance value which is determined depending upon the value of the electric resistance provided by the main body portion of the NC lathe and also a value of an electric resistance provided by a cutting fluid used in the cutting operation, such that the resistance value of the resistor 106 is not smaller than 50 Ω and is smaller than 500 Ω. In the present embodiment, the resistance value of the resistor 106 is set to be 250 Ω. An electric resistance denoted by a sign R2 represents an electric resistance acting on the first circuit 96. Thus, the electric resistance R2 may be interpreted to represent an electric resistance provided by the main spindle 22 and the other parts of the main body portion of the NC lathe. In the present embodiment, this electric resistance has a value not larger than 1 Ω. That is, the value of the electric resistance R1 is much larger than that of the electric resistance R2, and their relationship can be expressed by the following inequality:

$$R1 \gg R2$$

In an initial stage of the operation in which a cutting point of the cutting insert 112, i.e., a distal end or cutting point of the cutting tool 48 is in a position distant from the master workpiece 92, the first circuit 96 is held in open state in which the first circuit 96 is open. In the conventional apparatus, an electric current is not supplied from the power source to the electric circuit in such an initial stage, as discussed above in the Discussion of Related Art. On the other hand, in this embodiment of the invention, even when the cutting point of the cutting tool 48 is separated from the master workpiece 92, a small amount of electric current flows through the second circuit 98 which is held closed irrespective of whether the cutting tool 48 is in contact with the master workpiece 92 or not. This electric current is detected by the current detector 100, but the detected value of the current is small due to the electric resistance R1 having a large resistance value. However, the detected value is obviously larger than zero, and is not smaller than a predetermined first value and not larger than a predetermined second value that is larger than the predetermined first value. The computer 80 of the control device 78 operates to execute a program for reading the detected value of the electric current, and then determines that the contact detecting circuit 94 is in a normal condition if the read value of the electric current is not smaller than the predetermined first value and not larger than the predetermined second value. The normal condition is interpreted to means a condition in which an electric voltage is applied between the cutting point of the cutting tool 48 and the master workpiece 92, for enabling the circuit 94 to detect a contact of the cutting tool 48 and the master workpiece 92 when the contact of the two members 48, 92 is actually achieved. This step of checking if the contact detecting circuit 94 is in the normal condition is referred to as a "checking step". If it is not determined at the checking step that the contact detecting circuit 94 is in the normal condition, the computer 80 inhibits the movement devices 56, 66 from carrying out relative movement of the cutting tool 48 and the master workpiece 92 toward to each other. This arrangement is effective to prevent failure to detect the actual contact of the cutting tool 48 and the master workpiece 92, making it possible to avoid a dangerous situation in which at least one of the cutting tool 48 and the master workpiece 92 is further moved toward each other even after their actual contact, without a risk of damaging the cutting tool 48, the master workpiece 92 or holders holding the cutting tool 48 and the master workpiece 92.

If it is determined at the checking step that the contact detecting circuit 94 is in the normal condition, the computer 80 of the control device 78 operates to execute a program for controlling the Z-axis and X-axis motors 52, 62 of the respective Z-axis and X-axis movement devices 56, 66, such that the cutting tool 48 is moved toward the master workpiece 92, so as to be brought into proximity to an outer circumferential surface of the master workpiece 92. The cutting tool 48 is moved toward the master workpiece 92 at a high feed rate (rapid feed rate) while they are distant from each other. The cutting tool 48 is then decelerated at a predetermined decelerating position which is near to the master workpiece 92. Thus, the cutting tool 48 is brought into proximity to the outer circumferential surface of the master workpiece 92, with its approaching movement at a low feed rate (cutting feed rate). It is preferable this approaching movement of the cutting tool 48 to the outer circumferential surface of the master workpiece 92 is carried out by moving the cutting tool 48 only in the radial direction of the master workpiece 92, i.e., only in the X-axis direction.

Where a cutting fluid is used in the operation, there is a possibility that the cutting point of the cutting tool 48 is brought into connection with the master workpiece 92 via the cutting fluid before the cutting point of the cutting tool 48 is brought into contact with the master workpiece 92. Described more specifically, if the cutting point of the cutting tool 48 is wet with the cutting fluid when the cutting tool 48 approaches to the master workpiece 92, the cutting fluid sticking to the cutting point of the cutting tool 48 is brought into contact with the master workpiece 92 before the cutting point itself is brought into contact with the master workpiece 92. In this instance, the cutting tool 48 is likely to be electrically connected to the master workpiece 92 by the cutting fluid which has commonly has a certain degree of electrical conductivity. The electrical connection of the cutting tool 48 and the master workpiece 92 via the cutting fluid causes the first circuit 96 to be semi-closed, thereby allowing an electric current to flow through both the first and second circuits 96, 98 from the DC power source 104, resulting in an increase in a value of the flowing electric current detected by the current detector 100. However, a value of electric resistance of the cutting fluid is held larger than 500 Ω in this embodiment, although the resistance value of the cutting fluid generally varies depending upon its component. Thus, the increase in the detected value of the flowing electric current in this instance is relative small, and accordingly the detected value does not exceed a predetermined third value which is larger than the above-described second value. This means that the computer 80 does not erroneously determines that the cutting point of the cutting tool 48 is in contact with the outer circumferential surface of the master workpiece 92.

When the cutting point of the cutting tool 48 is actually brought into contact with the outer circumferential surface of the master workpiece 92, the first circuit 96 is completely closed, the electric current is fully allowed to flow through the first and second circuits 96, 98 from the DC power source 104, resulting in an abrupt increase in the value of the electric current detected by the current detector 100. Since the resistance value of the resistance R2 (provided in the first circuit 96) is adapted to be much smaller than that of the resistance R1 (provided in the second circuit 98) in the present embodiment, as described above, the detected value of the electric current is abruptly increased. The computer 80 determines that the cutting point of the cutting tool 48 has been brought into contact with the outer circumferential surface of the master workpiece 92, when confirming that the detected current value has exceeded the predetermined third value as a result of its abrupt increase.

Upon determination that the cutting tool 48 is in contact with the master workpiece 92, the computer 80 commands the X-axis movement device 66 (and additionally the Z-axis movement device 56 if it is also being activated) to stop the movement of the cutting tool 48, while calculating the current position of the cutting point of the cutting tool 48 in the X-axis direction, on the basis of an output provided by the rotary encoder 74. This current position of the cutting point of the cutting tool 48 may be represented by, for example, a distance over which the cutting tool 48 has been moved, as viewed in the X-axis direction, from a so-called "machine home position" until the contact of the cutting tool 48 with the master workpiece 92. Data representative of the calculated position of the cutting point of the cutting tool 48 are stored, as contact-position data, in a contact-position memory of the RAM 84. If there are previous contact-position data with respect to the same cutting tool 48 in the contact-position memory, the previous contact-position data are replaced with the new contact-position data. For example, the above-described distance from the machine home position to the contact position is gradually increased with an increase in the amount of wear of the cutting point of the cutting tool 48, and is also likely to be changed depending upon various factors. By renovating the contact-position data, it is possible to prevent a deterioration in a dimensional accuracy of the product produced in the operation.

This step of determining, as the contact position, the position of the cutting tool 48 relative to the master workpiece 92 when the transition from the open state to the closed state of the first circuit 96 is detected, is referred to as a "contact-position determining step". This step may be also referred to as a "contact-position-data storing step", since the contact position is stored in the computer 90. This step is advantageously implemented, for example, each time a predetermined time has been passed or a predetermined number of product have been produced, for preventing the dimensional accuracy of the product from being affected by various factors such as wear of the cutting insert 112 and deformation of the main body portion of the NC lathe due to a temperature change in the main body itself. This step may be implemented also at predetermined points of time, e.g., at the time of change of the operator or at the time when the NC lathe starts to be operated in each day, or when needed, e.g., before the first workpiece is machined after the cutting tool 42 or the cutting insert 112 has been replaced with a new one.

In the present embodiment, the data representative of the position of the cutting tool 48 upon its contact with the master workpiece 92 are stored in the computer 90. However, some other positional data, in addition to or in place of the contact-position data, may be stored in the computer 90. For example, it is also possible to locate the position the axis of the main spindle 22 about which the main spindle 22 is to be rotated, on the basis of the contact position of the cutting tool 48 and a known diameter of the master workpiece 92. This position of the rotary axis may be stored, as a reference position in the X-axis direction, in a reference-position memory of the RAM 84. Further, the cutting tool 48 may be brought into contact with an end face of the master workpiece 92, if needed, by moving cutting tool 48 toward the master workpiece 92 in the axial direction of the master workpiece 92, so that the position of the cutting tool 48, in which the cutting tool 48 is brought into at its cutting point with the end face of the master workpiece 92, is stored, as a reference position in the Z-axis direction.

After the positional data have been stored in the corresponding memory of the RAM 84, the master workpiece 92 is replaced with the workpiece 32, which in turn is attached to the chuck 28. The workpiece 32 is machined or cut by the cutting tool 48 in accordance with the currently stored or renovated positional data, and is formed into a product having a high degree of dimensional accuracy. Even if the cutting point of the cutting tool 48 is not accurately aligned with the height of the rotary axis of the main spindle 22, namely, even if the cutting point of the cutting tool 48 does not lie on a line which passes the axis and which is parallel to the X-axis direction, the dimensional accuracy of the product is not deteriorated as long as an amount of deviation of the cutting point from this line is not considerably large. That is, the disalignment of the cutting point of the cutting tool 48 with respect to the height of the axis of the main spindle 22 does not seriously affect the dimensional accuracy of the product because the positional data are prepared by using the cutting tool 48 which is used for forming the workpiece into the product. On the other hand, where a touch sensor is used for preparing the positional data, the dimensional accuracy of the product is deteriorated if a touch probe of the touch sensor deviates from the above-described line by an amount different from the amount by which the cutting point of the cutting tool deviates from the line. In the present embodiment, it is possible to avoid such a deterioration in the dimensional accuracy due to the disalignment of the cutting point with the respect of the axis of the main spindle 22.

The computer 80 keeps monitoring or reading the value of the electric current detected by the current detector 100 while the cutting tool 48 is moved toward the workpiece 32 in an initial stage of the operation. In this instance, the computer 80 determines that there is a possibility that the cutting insert 112 has been damaged, if the detected value of the electric current does not exceed the predetermined third value even after the cutting tool 48 has been moved to a predetermined position in which the cutting tool 48 should be brought into contact with the workpiece 32, namely, if the detected electric current value does not exceed the predetermined third value even while the relative position of the cutting tool 48 and the workpiece 32 detected by the rotary encoders 72, 74 satisfies a positional condition required for the contact of the two members 48, 32. After the determination of the possible damage of the cutting insert 112 has been made, the movement devices 56, 66 are commanded to immediately stop the movement of the cutting tool 48 toward the workpiece 32, and at the same time an alarm light or an alarm buzzer is activated to inform the operator that the cutting insert 112 has been possibly damaged.

Even after the workpiece 32 has started to be cut by the cutting tool 48, the computer 80 still keeps monitoring or reading the electric current value detected by the current detector 100. If the detected electric current value is reduced to be equal to or smaller than a predetermined fourth value during the cutting operation, the computer 80 determines that there is a possibility that the cutting insert 112 has been damaged, and then commands the movement devices 56, 66 to move the cutting tool 48 away from the workpiece 32. The cutting operation is immediately suspended, and the alarm light or buzzer is activated. The predetermined fourth value is set to be larger than the value of the electric current flowing through the cutting tool 48 and the workpiece 32 when the two members are shorted to each other by the cutting fluid. In either of this actual cutting stage and the above-described initial stage of the operation, the operator can take check the cutting tool 48 or cutting insert 112 in response to the activation of the alarm light or buzzer, so as to take a necessary procedure. In this embodiment, the possible damage of the cutting tool 48 is easily detected.

Where a plurality of workpieces 32 are successively cut, it is possible to measure a dimension of the formed product, for example, each time a predetermined number of products have been formed. If the measured dimension of the product is within a predetermined tolerance, the successively cutting operation is continued without modifying the above-described positional data or contact-position data currently stored in the RAM 84 of the computer 80. If the measured dimension of the product is not within a predetermined tolerance, the currently stored data are modified in view of an amount of deviation of the measured dimension from the target dimension, so that the successively cutting operation is continued with the thus modified data.

As is apparent from the above descriptions, a portion of the computer 80, which portion is assigned to detect the contact position in which the cutting point of the cutting tool 48 is brought into contact with the master workpiece 92, constitutes a control device as defined in mode (19) which is described above in SUMMARY OF THE INVENTION. The first circuit 96 and the current detector 100 constitute a contact detecting device as defined in mode (18). A portion of the computer 80 which portion is assigned to execute the above-described checking step cooperates with the second circuit 98 to constitute a checking device as defined in mode (18). A portion of the computer 80 which portion is assigned to execute the above-described contact determining step constitutes a contact determining device as defined in mode (18). It is noted that the term "cutting point" may be interpreted to correspond to a portion of the cutting edge of the cutting blade.

Figure 5:
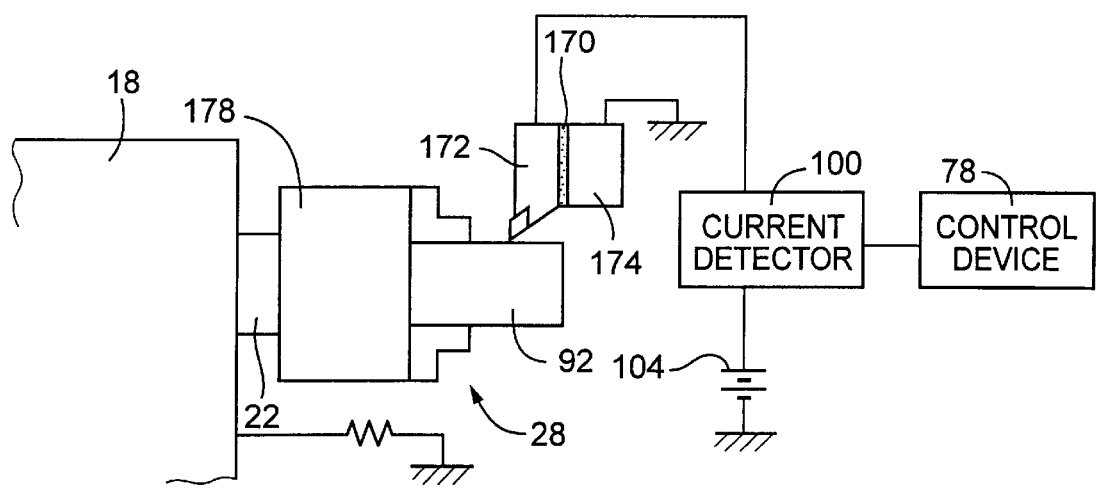
FIG. 5 is a block diagram schematically showing a cutting-blade-position controlling apparatus constructed according to a second embodiment of the invention.

Referring next to FIG. 5, there will be described a cutting-blade-position controlling apparatus which is constructed according to a second embodiment of this invention. While the fixed resistor 106 in which the terminals 116, 118 are disposed in the opposite ends of the resistive body 114 is used in the above-described first embodiment, the fixed resistor 106 is replaced with a resistive layer 170 in this second embodiment. As schematically shown in of FIG. 5, the resistive layer 170 is interposed between a cutting tool 172 and a turret 174 which are provided by respective electrically conductive members each having a high degree of electrical conductivity. The resistive layer 170 may be formed on a surface of either one of the cutting tool 172 and the turret 174 so as to be bonded to the surface, or may be formed of an independent sheet so as to be simply interposed between the two members 172, 174 without being bonded to any one of the two members 172, 174. In any one of these cases, the cutting tool 172 and the turret 174 have to be fixed relative to each other, with the resistive layer 170 being interposed between the two members 172, 174. A fixing device for the fixing the two members 172, 174 has to be adapted to inhibit the two members 172, 174 from having an electrical continuity with each other.

The resistive layer 170 may be formed of a synthetic resin, ceramic or other electrically insulating material, into which metallic powders or other electrically conductive powders are mixed. The formation of the resistive layer 170 on the surface of the conductive member may be achieved, for example, in accordance with a PVD method, a CVD method, a spray-forming method or a coating method. Where a resistive layer is formed on a cutting tool, a cutting-tool holding member or other member which preferably has a high degree of hardness, it is preferable that the resistive layer is formed in accordance with the PVD method since the conductive layer is heated at a lower temperature in a practice of the PVD method than in a practice of the CVD method.

Figure 6:
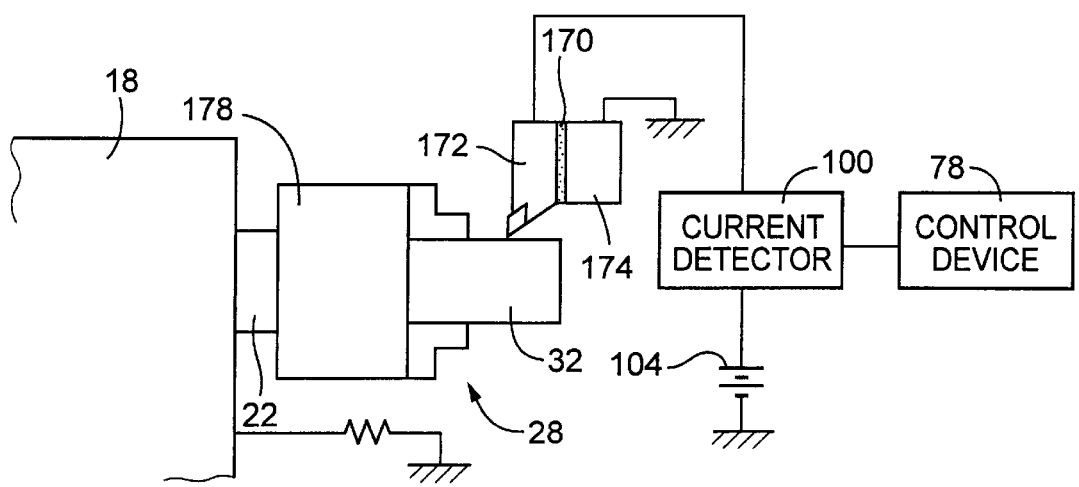
FIG. 6 is a block diagram schematically showing a cutting-blade-position controlling apparatus constructed according to a third embodiment of the invention.

FIG. 6 shows a third embodiment of the invention, which is identical to the second embodiment shown in FIG. 5 except that the cutting point of the cutting tool 172 is brought into contact with an outer circumferential surface of the workpiece 32 which is to be cut. Where the workpiece 32 has a measured or otherwise known diameter, the workpiece 32 can be formed into a product having a desired diameter, by positioning the cutting tool 172 in a predetermined radial position that is determined on the basis of the known diameter of the workpiece 32, the desired diameter of the product and the contact position in which the cutting tool 172 has been contact with the outer circumferential surface of the workpiece 32 having the known diameter. Namely, the cutting tool 172 is moved relative to the workpiece 32 over a predetermined distance in the axial direction, after having being moved to the above-described predetermined radial position.

Figure 7:
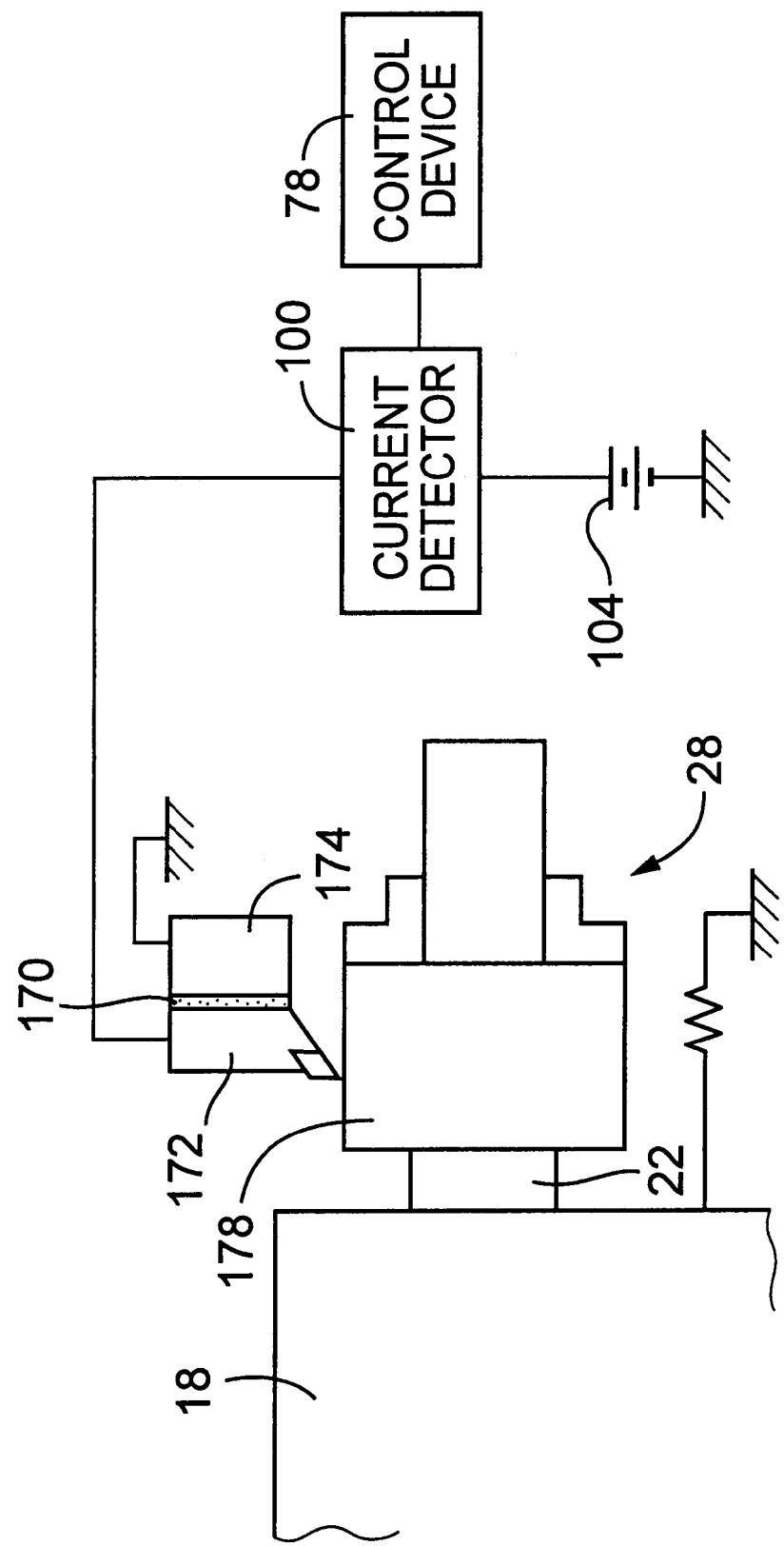
FIG. 7 is a block diagram schematically showing a cutting-blade-position controlling apparatus constructed according to a fourth embodiment of the invention.

FIG. 7 shows a fourth embodiment of the invention, which is identical to the second and third embodiments shown in FIGS. 5 and 6 except that the cutting point of the cutting tool 172 is brought into contact with an outer circumferential surface of a main body 178 of the chuck 28. In this fourth embodiment, the above-described radial position of the cutting tool 172 is determined on the basis of a diameter of the main body 178 of the chuck 28, the desired diameter of the product and the contact position in which the cutting tool 172 has been contact with the outer circumferential surface of the main body 178 of the chuck 28. In this embodiment, the main body 178 of the chuck 28 constitutes the above-described object in the form of a reference portion of the machine tool. It is preferable that the object (such as the mater workpiece 92, the workpiece 32 and the main body 178 of the chuck 28) which is to be brought into contact with the cutting tool has to have a high degree of roundness and also a high degree of coaxial relation with the main spindle 22 so as to be rotatable without its run-out.

Figure 8:
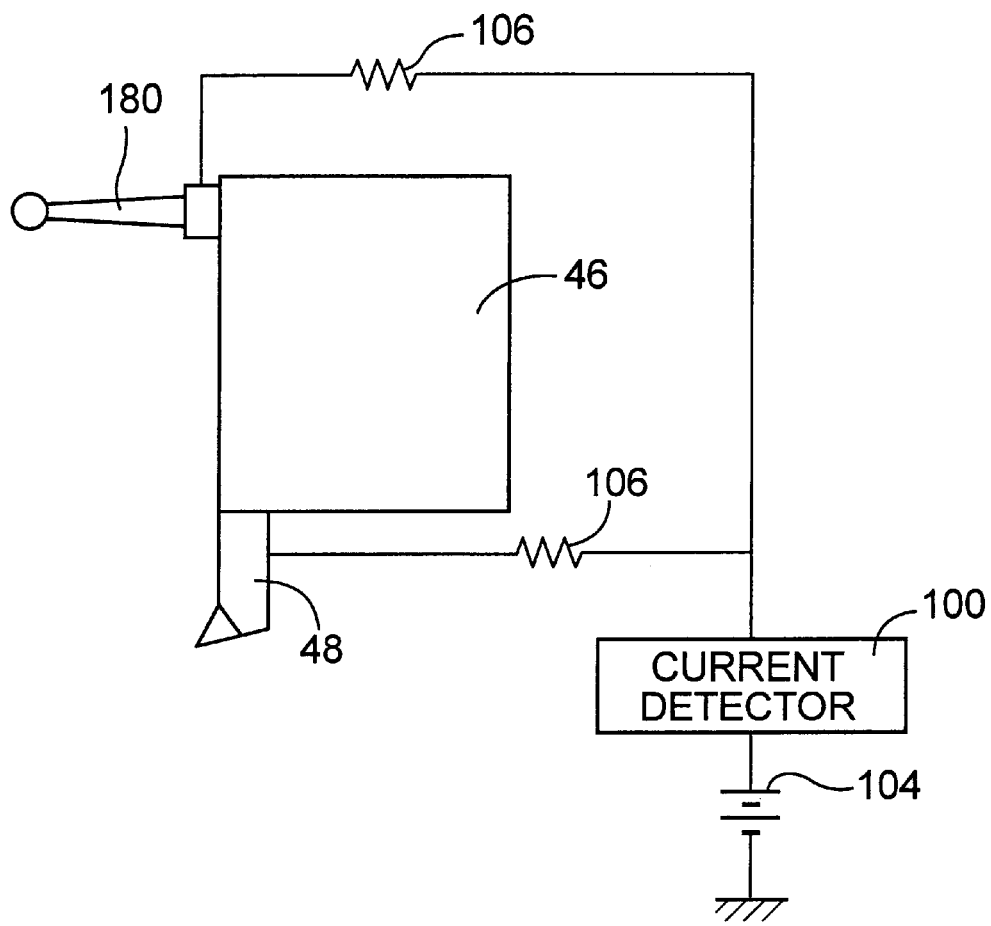
FIG. 8 is a block diagram schematically showing a cutting-blade-position controlling apparatus constructed according to a fifth embodiment of the invention.

FIG. 8 shows a fifth embodiment of the invention, in which a touch probe 180, as well as the cutting tool 48, is attached to the turret 46. A contact detecting circuit, which is similar to the above-described contact detecting circuit 94, is provided to incorporate therein the touch probe 180. The use of the touch probe 180 makes it possible to locate the position of the rotary axis of the workpiece 32 or master workpiece 92 which is fixed to the chuck 28, by bringing a spherical contact end of the touch probe 180 in contact with two portions of an outer circumferential surface of the workpiece 32 or master workpiece 92 which portions are diametrically opposed to each other. That is, an intermediate point between the detected two portions of the outer circumferential surface of the workpiece 32 or master workpiece 92 can be determined as the position of the rotary axis. Such data obtained by the touch probe 180 can be used in the control of the movement of the cutting tool 48, if a positional relationship between the cutting tool 48 and the touch probe 180, i.e., a relative position of the two members 48, 180 is known. This relative position can be known, for example, by bringing the cutting point of the cutting tool 48 and the spherical contact end of the touch probe 180 into contact with the same portion of the workpiece 32 or master workpiece 92. The relative position of the two members 32, 92 can be calculated on the basis of a distance over which the turret 46 is moved between a cutting-tool contact position in which the cutting tool 48 is brought into contact with the above-described same portion and a touch-probe contact position in which the touch probe 180 is brought into contact with the above-described same portion.

Figure 9:
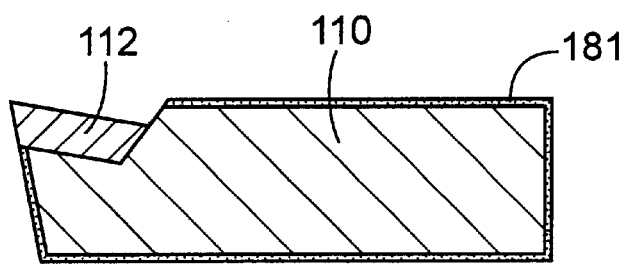
FIG. 9 is a view showing a cutting tool which is used in a cutting-blade-position controlling apparatus constructed according to a sixth embodiment of the invention.

It is also possible to cover a surface of the cutting blade, the cutting tool or the cutting-tool holding member, with an electrically insulating coating. FIG. 9 shows a sixth embodiment of the invention in which the tool body 110 of the cutting tool 48 is covered at its surface with an electrically insulating film or coating 181. The provision of the insulating coating 181 on the surface of the tool body 110 is effective to prevent the turret 46 and the tool body 110 of the cutting tool 48 from being shorted at their mutually adjacent portions to each other by a cutting fluid, cutting chips or other substance sticking to the surfaces of the turret 46 and the tool body 110 of the cutting tool 48, namely, prevent electrical connection between the mutually adjacent portions through a by-passing passage which is formed of the sticking substance and which is positioned in parallel with the fixed resistor 106 of the second circuit 98. Therefore, this arrangement advantageously avoids an erroneous determination that the cutting insert 112 of the cutting tool 48 has been brought into contact with the workpiece 32 or master workpiece 92. Such an erroneous determination could be caused by an increase in the detected value of the electric current as a result of the electrical connection between the turret 46 and the cutting tool 48, which is effectively prevented by the insulating coating 181 in this sixth embodiment. It is noted that the electrically insulating coating 181 is formed on the surface of the tool body 110 of the cutting tool 48 such that the insulating coating 181 covers the surface of the tool body 110 except portions of the surface which are to be held in contact with the cutting blade 112, the terminal 116 of the resistor 106 and the contact member 162.

The sticking of the cutting fluid and the cutting chips to the surfaces of the members (e.g., the cutting blade, the cutting tool, the cutting-tool holding member, the workpiece, the master workpiece, the workpiece, and the reference portions) can be prevented also by implementing a cleaning step in which the cutting fluid and the cutting chips are removed from the members before the implementation of the contact determining step. That is, this cleaning step also serves to prevent the above-described erroneous determination that the cutting tool 48 has been brought into contact with the workpiece 32 or master workpiece 92. The cleaning step may be substituted for the above-described provision of the electrically insulating layer on the surface of the cutting tool, or alternatively may be implemented together with the provision of the insulating layer. In the latter case, the above-described erroneous determination can be more surely avoided.

Figure 10:
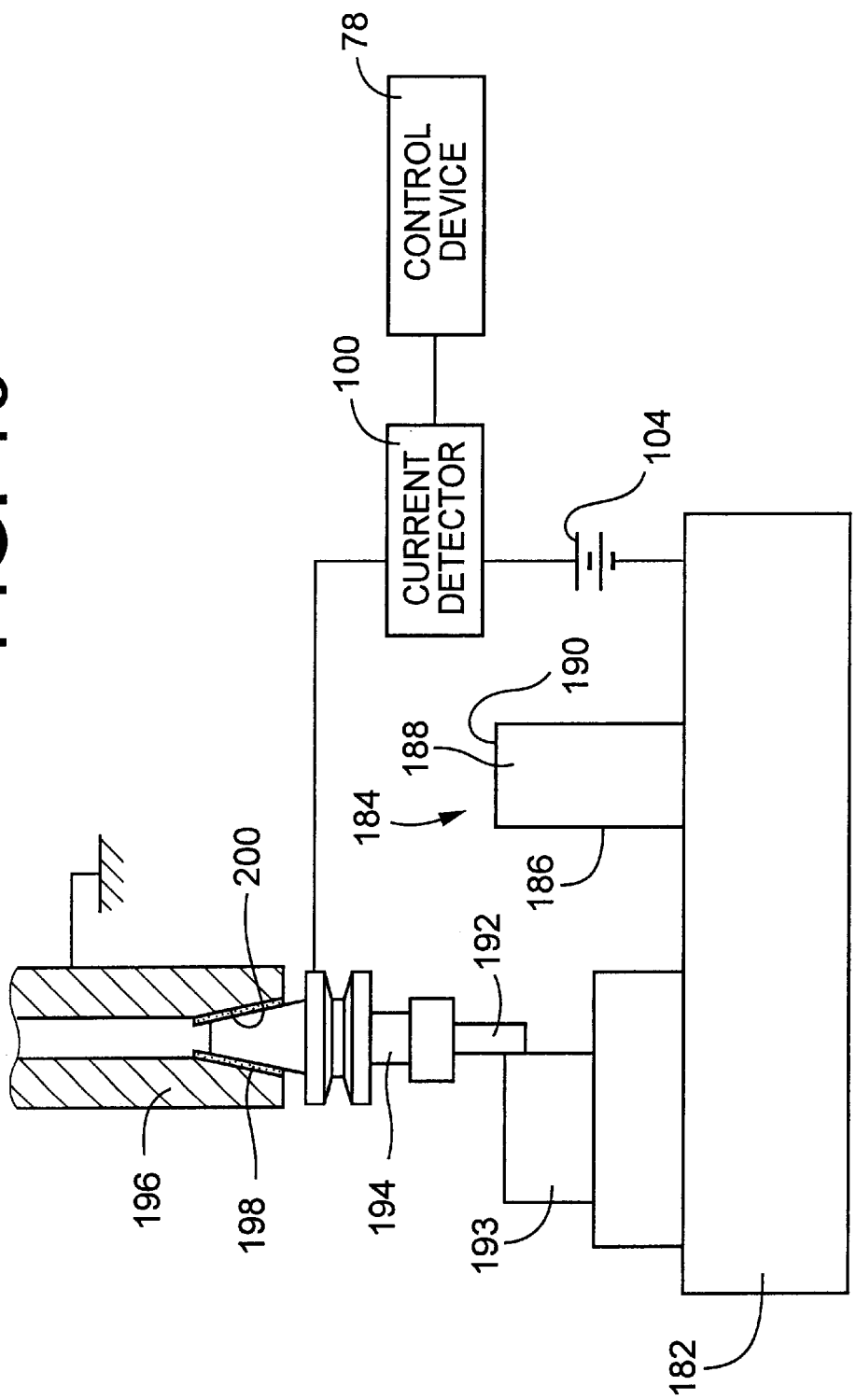
FIG. 10 is a block diagram schematically showing a cutting-blade-position controlling apparatus constructed according to a seventh embodiment of the invention.

Referring next to FIG. 10, there will be described a cutting-blade-position controlling apparatus which is constructed according to a seventh embodiment of this invention. This cutting-blade-position controlling apparatus is built in a machining center, a milling machine or a boring machine. In this seventh embodiment, a reference portion 184 which is fixed to a main structure 182 of the machining center, milling machine or boring machine constitutes the above-described object to be brought in contact with the cutting tool. The reference portion 184 preferably has three reference surfaces 186, 188, 190 which are held perpendicular to the X-axis, Y-axis and Z-axis directions, respectively. A rotary cutting tool 192 is brought into contact at its cutting point with each of these surfaces 186, 188, 190, for thereby detecting a contact position in which the cutting tool 192 is brought into contact with each of the surfaces 186, 188, 190. The thus detected contact position is used as a reference position in the corresponding one of the X-axis, Y-axis and Z-axis directions.

The rotary cutting tool 192 may be brought into contact with the reference surfaces 186, 188, 190, with or without the cutting tool 192 being rotated. However, it is preferable that the cutting tool 192 is being rotated upon its contact with the X-axis-direction reference surface 186 or the Y-axis-direction reference surface 188, particularly, where the cutting tool 192 has a plurality of cutting teeth or edges whose respective radial distances from the rotary axis of the cutting tool 192 are different from each other. In this instance, it is possible to determine, as the contact position, the relative position in which the reference surface 186 or 188 is brought into contact with one of the cutting edges which has a larger radial distance from the rotary axis than the other cutting edges. When the cutting tool 192 is brought into contact with the Z-axis-direction reference surface 190, it is preferable that the cutting tool 192 is being rotated if the cutting edges of the cutting tool 192 having respective lower end portions whose axial heights are different from each other. In this instance, it is possible to determine, as the contact position, the relative position in which the reference surface 190 is brought into contact with one of the lower end portions of the respective cutting edges which has a smaller height than the lower end portions of the other cutting edges. It is noted that if a workpiece 193 also has three reference surfaces which are perpendicular to the X-axis, Y-axis and Z-axis directions, the cutting tool 192 may be brought into contact with the workpiece 193 in place of the reference portion 184.

Also in this seventh embodiment of FIG. 10, an electric resistance is provided between the cutting tool and a main body portion of the machine tool. Described specifically, a resistive layer 198 is provided between the blade holding member in the form of a tool holder 194 holding the rotary cutting tool 192, and a tool spindle 196 to which the tool holder 194 is attached. The resistive layer 198 is formed on an inner circumferential surface of a taper hole 200 of the tool spindle 196, so that the resistive layer 198 is interposed between the inner circumferential surface of the taper hole 200 and an outer circumferential surface of a taper shank portion of the tool holder 194. Also in this arrangement, a fixing device (e.g., a collet chuck, draw bar) for removably fixing the tool holder 194 to the tool spindle 196 has to be adapted to inhibit the tool holder 194 and the tool spindle 196 from having an electrical continuity with each other.

Figure 11:
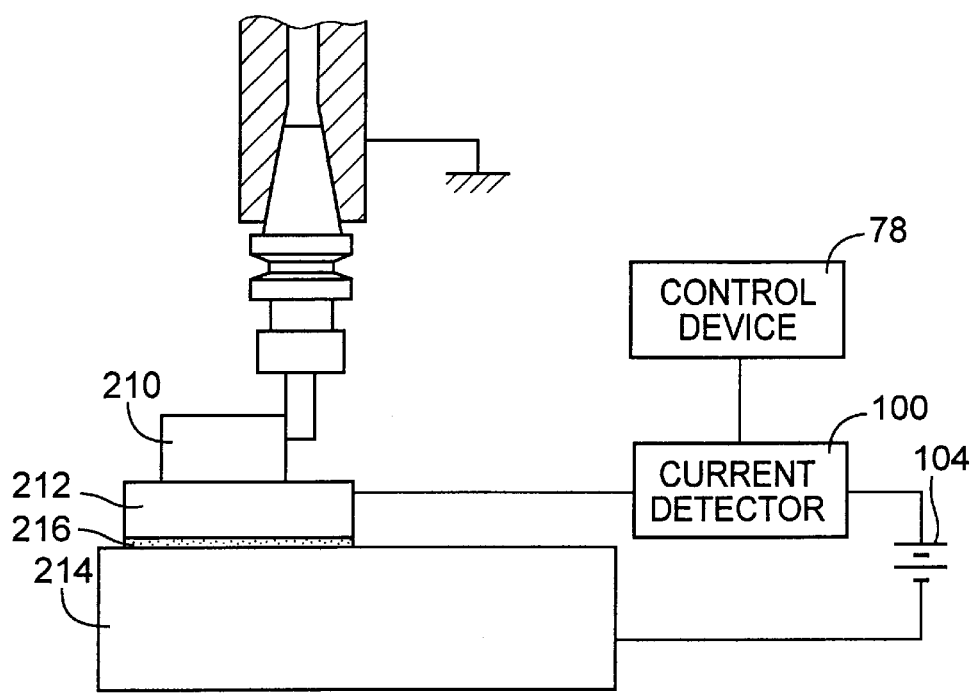
FIG. 11 is a block diagram schematically showing a cutting-blade-position controlling apparatus constructed according to an eighth embodiment of the invention.

FIG. 11 shows an eighth embodiment of the invention which is different from the seventh embodiment of FIG. 10, in that an electric resistance is provided between the main body portion of the machine tool and a workpiece holding member for holding a workpiece. That is, a resistive layer 216 is interposed between the main body in the form of a main structure 214 and the workpiece holding member in the form of a jig or fixture 212 to which a workpiece 210 is fixed.

Figure 12:
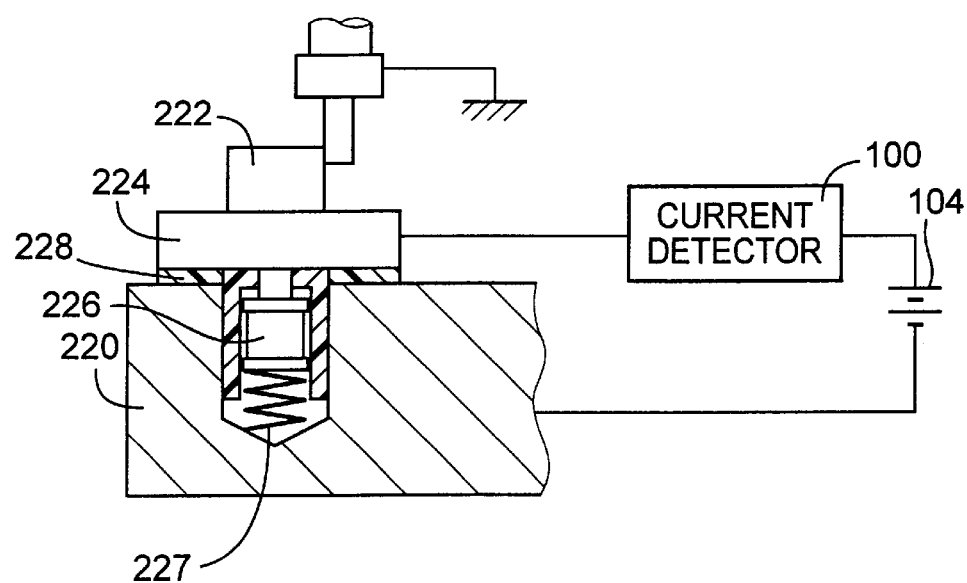
FIG. 12 is a block diagram schematically showing a cutting-blade-position controlling apparatus constructed according to a ninth embodiment of the invention.

FIG. 12 shows a ninth embodiment of the invention which is identical to the eight embodiment of FIG. 11, in that an electric resistance is provided between the main body portion of the machine tool and the workpiece holding member for holding a workpiece. However, the resistive layer 216 is replaced with a fixed resistor 226 which is provided between the main body of the machine tool in the form of a work table 220 that is movable relative to the main structure by a movement device, and the workpiece holding member in the form of a jig or fixture 224 to which a workpiece 222 is fixed. Like the above-described fixed resistor 106 which is best shown in FIG. 3, the fixed resistor 226, together with a compression coil spring 227 is received in a generally cylindrical insulating body 228 which is made of an electrically insulating material, such that the resistor 226 is movable relative to the cylindrical insulating body 228 in an axial direction of the cylindrical housing 228.

Figure 13:
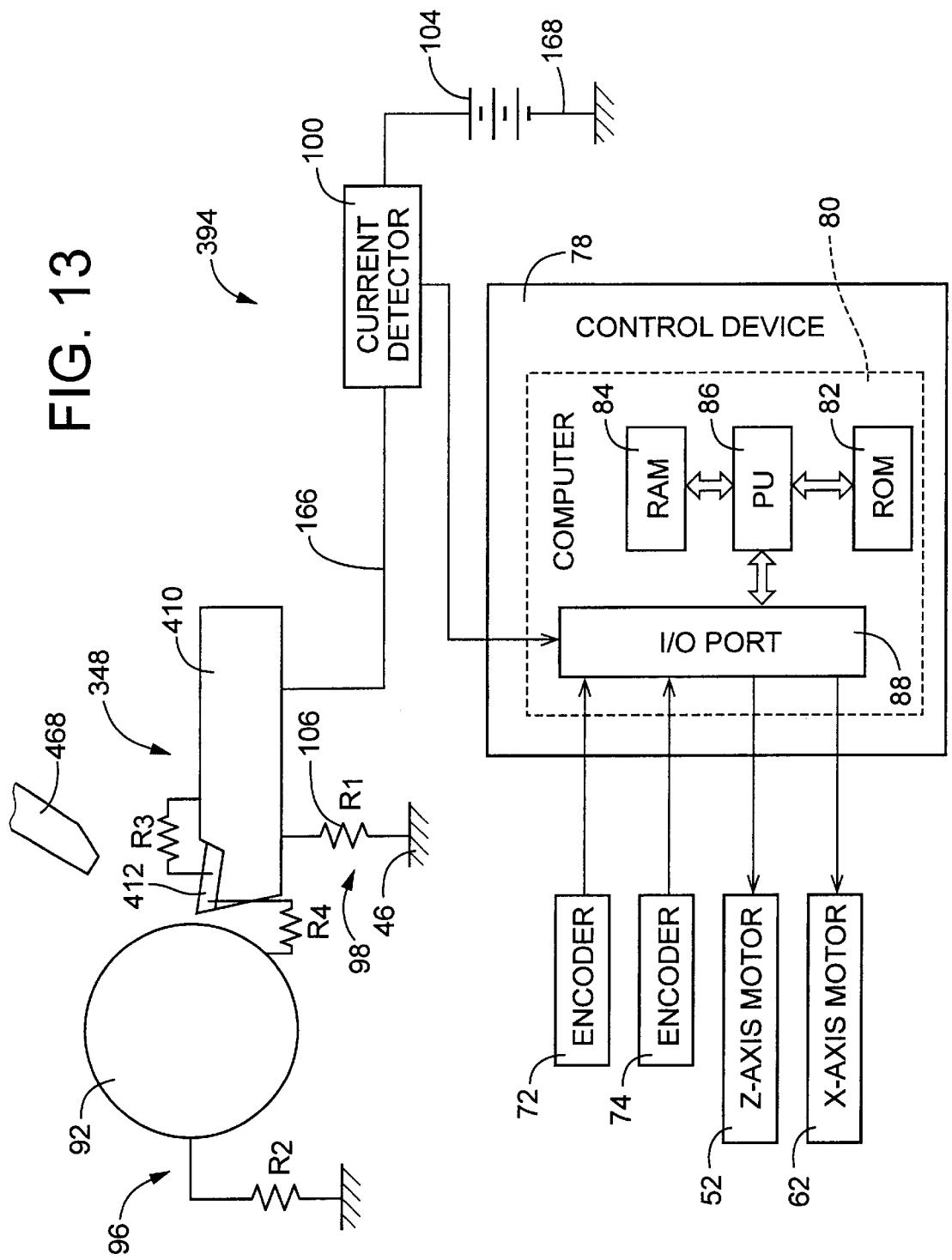
FIG. 13 is a block diagram schematically showing a cutting-blade-position controlling apparatus constructed according to a tenth embodiment of the invention.
Figure 14:
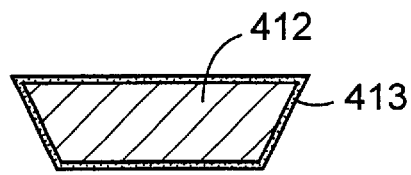
FIG. 14 is a view showing a cutting insert constructed according to the invention.

Referring next to FIGS. 13 and 14, there will be described a cutting-blade-position controlling apparatus which is constructed according to a tenth embodiment of this invention. The cutting-blade-position controlling apparatus of this tenth embodiment is substantially identical to that of the above-described first embodiment which are shown in FIGS. 1–4, except that the lathe cutting tool 48 is replaced with a lathe cutting tool 348. In the following description of this second embodiment, the same reference numeral as used in the first embodiment will be used to identify the elements which are the same as or similar to those in the first embodiment. No redundant description of these elements will be provided, in the interest of simplification of the description.

The lathe cutting tool 348 includes a tool body 410, and a replaceable cutting insert 412 which is attached to the tool body 410 by clamping means (not shown). The cutting insert 412 is made of an electrically conductive material having a high degree of electrical conductivity, and is covered at its entirety with a conductive film or coating 413, as shown in FIG. 14. The conductive coating 413 is formed of a material having a suitable degree of electric resistance such as a mixture of an electrically insulating material (e.g., a synthetic resin and ceramic) and an electrically conductive material (e.g. a metallic powder). The conductive coating 413 formed of such a suitable material is bonded to the entire surface of the cutting insert 412 such that the conductive coating 413 has a constant and accurate thickness over the entire surface of the cutting insert 412. The bonding of the conductive coating 413 to the surface of the cutting insert 412 may be achieved, for example, in accordance with a PVD method, a CVD method, a spray-forming method or a coating method. It is preferable that the conductive coating 413 is formed in accordance with the PVD method since the cutting insert 412 is heated at a lower temperature in a practice of the PVD method than in a practice of the CVD method.

It is preferable but not essential that the conductive coating 413 has a thickness constant over its entirety, as long as the thickness of a portion of the coating 413 positioned in the cutting edge of the cutting insert 412 is known. It is possible to reduce a possibility of chipping of the cutting insert 412 or damage of the master workpiece 92, by increasing the thickness of the conductive coating 413. However, the thickness of the conductive coating 413 may be reduced to such an extent that the thickness is still large enough to avoid complete destruction of the conductive coating 413 when the relative movement of the cutting insert 412 and the master workpiece 92 is stopped in response to the detection of the contact of the two members 92, 412. Even if the thickness of the coating 413 is reduced such an extent that the thickness is no longer large enough to avoid the complete destruction of the coating 413, it is possible to still enjoy the technical advantages provided by the present invention, as long as the reduced thickness of the coating 413 is larger enough to avoid damages of the cutting insert 412 and the master workpiece 92.

In the cutting-blade-position controlling apparatus of this tenth embodiment of this invention, a contact of the cutting tool 348 with the master workpiece 92 is detected by a contact detecting circuit 394 which is connected to the control device 78. In the NC lathe equipped with the contact detecting circuit 394 which is constructed as described above, an operation for cutting the workpiece 32 is carried out as follows:

The operation is initiated by attaching the cutting tool 348 and the master workpiece 92 to the turret 46 and the chuck 28, respectively, so that the first and second circuits 96, 98 are formed. In the first circuit 96, the cutting tool 348, the current detector 100, the DC power source 104, the main body portion of the NC lathe and the master workpiece 92 are arranged in series. In the second circuit 98, the cutting tool 348, the current detector 100, the DC power source 104, the main body portion of the NC lathe and the fixed resistor 106 are arranged in series. An electric resistance denoted by a sign R1 in FIG. 13 represents an electric resistance acting on the second circuit 98 Thus, the electric resistance R1 actually includes not only the fixed resistor 106 but also an electric resistance provided by the turret 46 and other parts of the main body portion of the NC lathe. However, the electric resistance R1 may be interpreted to represent the fixed resistor 106, since the electric resistance provided by the main body portion of the NC lathe has a considerably small resistance value. It is preferable that the fixed resistor 106 has a resistance value which is determined depending upon the value of the electric resistance provided by the main body portion of the NC lathe and also a value of an electric resistance provided by a cutting fluid used in the cutting operation, such that the resistance value of the resistor 106 is not smaller than 50 Ω and is smaller than 500 Ω. In the present embodiment, the resistance value of the resistor 106 is set to be 250 Ω.

An electric resistance denoted by a sign R2 represents an electric resistance acting on the first circuit 96. The electric resistance R2 represents an electric resistance provided by the main spindle 22 and the other parts of the main body portion of the NC lathe. Electric resistances denoted by signs R3, R4 represent electric resistances acting on the first circuit 96. The electric resistance R3 represents an electric resistance provided by a portion of the conductive coating 413 which portion is interposed between the cutting insert 412 and the tool body 410. The electric resistance R4 represents an electric resistance provided by a portion of the conductive coating 413 which portion is interposed between the cutting insert 412 and the master workpiece 92 upon contact of the cutting insert 412 and the master workpiece 92 with each other via the conductive coating 413. Each of the values of the electric resistances R1, R3 and R4 is adapted to be much larger than that of the electric resistance R2. As to a relationship between the values of the respective electric resistances R3 and R4, the value of the electric resistance R3 is commonly much smaller than that of the electric resistance R4 due to a difference in cross sectional area between conductive passages respectively provided by the above-described two portions of the conductive coating 413. Thus, the relationship can be commonly expressed by the flowing inequality:

$$R4 \gg R3$$

Further, the value of the electric resistance R4 is preferably adapted to be substantially equal to or smaller than that of the electric resistance R1. This is because it is preferable the value of the electric current is doubled or more upon the contact of the cutting insert 412 with the master workpiece 92 via the conductive coating 413, namely, upon transition from a closed state of the first circuit 96 in which the electric current is allowed to flow through only the second circuit 98, to an open state of the first circuit 96 in which the electric current is allowed to flow through not only the second circuit 98 but also the first circuit 96. The transition from the closed state to the open state can be easily detected with an increase in an amount of change in the value of the flowing electric current upon the transition. In the present embodiment, the value of the electric resistance R4 is adapted to be about 10–50% of that of the electric resistance R1. Thus, in the present embodiment, the relationship among R1, R2, R3 and R4 can be expressed by the flowing inequality:

$$R1 > R4 \gg R3 \gg R2$$

In an initial stage of the operation in which a cutting point of the cutting insert 412, i.e., a distal end or cutting point of the cutting tool 348 is in a position distant from the master workpiece 92, the first circuit 96 is held in open state in which the first circuit 96 is open. In this embodiment of the invention, even when the cutting point of the cutting tool 348 is separated from the master workpiece 92, a small amount of electric current flows through the second circuit 98 which is held closed irrespective of whether the cutting tool 348 is in contact with the master workpiece 92 or not. This electric current is detected by the current detector 100, but the detected value of the current is small due to the electric resistance R1 having a large resistance value. However, the detected value is obviously larger than zero, and is not smaller than a predetermined first value and not larger than a predetermined second value that is larger than the predetermined first value. The computer 80 of the control device 78 operates to execute a program for reading the detected value of the electric current, and then determines that the contact detecting circuit 394 is in a normal condition if the read value of the electric current is not smaller than the predetermined first value and not larger than the predetermined second value. The normal condition is interpreted to means a condition in which an electric voltage is applied between the cutting point of the cutting tool 348 and the master workpiece 92, for enabling the circuit 394 to detect a contact of the cutting tool 348 and the master workpiece 92 when the contact is actually achieved. If it is not determined at this checking step that the contact detecting circuit 394 is in the normal condition, the computer 80 inhibits the movement devices 56, 66 from carrying out relative movement of the cutting tool 348 and the master workpiece 92 toward to each other. This arrangement is effective to prevent failure to detect the actual contact of the cutting tool 348 and the master workpiece 92, making it possible to avoid a dangerous situation in which at least one of the cutting tool 348 and the master workpiece 92 is further moved toward each other even after their actual contact, without a risk of damaging the cutting tool 348, the master workpiece 92 or holders holding the cutting tool 348 and the master workpiece 92.

If it is determined at the checking step that the contact detecting circuit 394 is in the normal condition, the computer 80 of the control device 78 operates to execute a program for controlling the Z-axis and X-axis motors 52, 62 of the respective Z-axis and X-axis movement devices 56, 66, such that the cutting tool 348 is moved toward the master workpiece 92, so as to be brought into proximity to an outer circumferential surface of the master workpiece 92. The cutting tool 348 is moved toward the master workpiece 92 at a high feed rate while they are distant from each other. The cutting tool 348 is then decelerated at a predetermined decelerating position which is near to the master workpiece 92. Thus, the cutting tool 348 is brought into proximity to the outer circumferential surface of the master workpiece 92, with its approaching movement at a low feed rate. It is preferable this approaching movement of the cutting tool 348 to the outer circumferential surface of the master workpiece 92 is carried out by moving the cutting tool 348 only in the radial direction of the master workpiece 92, i.e., only in the X-axis direction.

Where a cutting fluid is used in the operation, there is a possibility that the cutting point of the cutting tool 348 is brought into connection with the master workpiece 92 via the cutting fluid before the cutting point of the cutting tool 348 is brought into contact with the master workpiece 92. Described more specifically, if the cutting point of the cutting tool 348 is wet with the cutting fluid when the cutting tool 348 approaches to the master workpiece 92, the cutting fluid sticking to the cutting point of the cutting tool 348 is brought into contact with the master workpiece 92 before the cutting point itself is brought into contact with the master workpiece 92. In this instance, the cutting tool 348 is likely to be electrically connected to the master workpiece 92 by the cutting fluid which has commonly has a certain degree of electrical conductivity. The electrically connection of the cutting tool 348 and the master workpiece 92 via the cutting fluid causes the first circuit 96 to be semi-closed, thereby allowing an electric current to flow through both the first and second circuits 96, 98 from the DC power source 104, resulting in an increase in a value of the flowing electric current detected by the current detector 100. However, since a value of electric resistance of the cutting fluid is held larger than 500 Ω in this embodiment the increase in the detected value of the flowing electric current in this instance is relative small. The detected value accordingly does not exceed a predetermined third value which is larger than the above-described second value. This means that the computer 80 does not erroneously determines that the cutting point of the cutting tool 348 is in contact with the outer circumferential surface of the master workpiece 92.

When the cutting point of the cutting tool 348 or the cutting insert 412 is actually brought into contact with the outer circumferential surface of the master workpiece 92, the first circuit 96 is completely closed. In this instance, the cutting tool 348 is in contact with the master workpiece 92 via the conductive coating 413 which covers the cutting insert 412, the electric current flows through the electric resistances R3, R4, R2 which are arranged in series in the first circuit 96. Since the relationship among R2, R3 and R4 is expressed by the inequality R4>>R3>>R2, namely, the value of the electric resistance R4 is the largest among the values of the three electric resistances R2, R3, R4, the value of the electric current flowing through the first circuit 96 generally depends on the value of the electric resistance R4, which is adapted to be about 10–50% of that of the electric resistance R1. Therefore, the value of the electric current detected by the current detector 100 is abruptly increased such that the detected value after the contact of the cutting toll 348 with the master workpiece 92 corresponds to about 2–10 times the detected value before the contact. The computer 80 determines that the cutting point of the cutting tool 348 has been brought into contact with the outer circumferential surface of the master workpiece 92, when confirming that the detected current value has exceeded the predetermined third value as a result of its abrupt increase. This step corresponds to a contact determining step. In the present embodiment in which the cutting insert 412 and the master workpiece 92 are brought into contact with each other via the conductive coating 413 that is made of material softer than those of the two members 92, 412, it is possible to minimize a risk for damage of these two members 92, 412.

In the above-described contact determining step, there is a possibility that the cutting tool 348 and the master workpiece 92 are connected via a cutting fluid even before the two members 92, 348 are brought into contact with each other. In such a case, if the cutting fluid has an electrical conductivity, the electric current is likely to be flow through the cutting fluid, thereby possibly causing an erroneous determination that the cutting tool 348 has been brought into contact with the mater workpiece 92. For preventing such an erroneous determination, the predetermined third value is preferably set to be sufficiently larger than a value of the electric current flowing through the cutting fluid.

In the present embodiment, prior to the implementation of the contact determining step, there is implemented a cleaning step in which a compressed air is blasted from a nozzle 468, for removing the cutting fluid and the cutting chips sticking to surfaces of the cutting tool 348 and the master workpiece 92. In this cleaning step, it is preferable to clean surfaces of the turret 46 and the chuck 28, in addition to the cutting tool 348 and the master workpiece 92. The implementation of the cleaning step is effective to prevent the above-described erroneous determination.

Upon determination that the cutting tool 348 is in contact with the master workpiece 92, the computer 80 commands the X-axis movement device 66 (and additionally the Z-axis movement device 56 if it is also being activated) to stop the movement of the cutting tool 348, while calculating the current position of the cutting point of the cutting tool 348 in the X-axis direction, on the basis of an output provided by the rotary encoder 74. Data representative of the calculated position of the cutting point of the cutting tool 348 are stored, as contact-position data, in a contact-position memory of the RAM 84. This step corresponds is referred to as a "contact-position determining step", or may be also referred to as a "contact-position-data storing step".

In the present embodiment, the data representative of the position of the cutting tool 348 upon its contact with the master workpiece 92 are stored in the computer 90. However, some other positional data, in addition to or in place of the contact-position data, may be stored in the computer 90. For example, it is also possible to locate the position the axis of the main spindle 22 about which the main spindle 22 is to be rotated, on the basis of the contact position of the cutting tool 348 and a known diameter of the master workpiece 92. This position of the rotary axis may be stored, as a reference position in the X-axis direction, in a reference-position memory of the RAM 84. Further, the cutting tool 348 may be brought into contact with an end face of the master workpiece 92, if needed, by moving cutting tool 348 toward the master workpiece 92 in the axial direction of the master workpiece 92, so that the position of the cutting tool 348, in which the cutting tool 348 is brought into at its cutting point with the end face of the master workpiece 92, is stored, as a reference position in the Z-axis direction.

After the positional data have been stored in the corresponding memory of the RAM 84, the master workpiece 92 is replaced with the workpiece 32, which in turn is attached to the chuck 28. The workpiece 32 is machined or cut by the cutting tool 348 in accordance with the currently stored or renovated positional data, and is formed into a product having a high degree of dimensional accuracy.

The computer 80 keeps monitoring or reading the value of the electric current detected by the current detector 100 while the cutting tool 348 is moved toward the workpiece 32 in an initial stage of the operation, so as to detect a contact of the cutting tool 348 with the workpiece 32 via the conductive coating 413, and then detect a direct contact of the cutting tool 348 with the workpiece 32 after the conductive coating 413 has been destroyed. The value of the electric current detected by the current detector 100 exceeds the above-described predetermined third value when the cutting tool 348 is brought into contact with the workpiece 32 via the conductive coating 413, when the cutting tool 348 is brought into contact with the master workpiece 92 via the conductive coating 413. Thus, the computer 80 can detect the contact of the cutting tool 348 with the workpiece 32 via the conductive coating 413, on the basis of the fact that the detected value of the electric current has exceeded the predetermined third value. When the cutting tool 348 is brought into direct contact with the workpiece 32 after the destruction of the conductive coating 413, the detected value of the electric current is further increased since the value of the electric resistance R4 is zeroed. In this instance, the value of the electric resistance acting on the first circuit 96 corresponds to the sum of the values of the electric resistances R2, R3 (R2+R3). This value is considerably smaller than the sum of the values of the electric resistances R2, R3, R4 (R2+R3+R4), i.e., the value of the electric resistance acting on the first circuit 96 when the cutting tool 348 is in contact with the workpiece 32 via the conductive coating 413. That is, the detected value of the electric current is increased upon the direct contact of the cutting tool 348 with the workpiece 32, by an amount corresponding to the reduction in the value of the electric resistance acting on the first circuit 96. Thus, the computer 80 can detect the direct contact of the cutting tool 348 with the workpiece 32, on the basis of the fact that the detected value of the electric current has been further increased When the cutting tool 348 and the workpiece 32 are in direct contact with each other without intervention of the conductive coating 413 therebetween, the value of the flowing electric current depends on the sum of the values of the electric resistances R2, R3, as described above. However, this value of the flowing electric current can be considered to depend on almost only the value of the electric resistance R3 which corresponds to the electric resistance provided by the portion of the conductive coating 413 interposed between the cutting insert 412 and the tool body 410, since the value of the resistance R2 is considerably smaller than the value of the resistance R3. The value of the electric resistance R3 is almost proportional to the cross sectional area of the conductive passage provided by the above-described portion of the conductive coating 413. Therefore, it can be determined that the cutting insert 412 is a currently required cutting insert, i.e., a correct cutting insert in accordance with a cutting operation program, if the value of the electric current detected by the current detector 100 upon the direct contact of the cutting insert 412 with the workpiece 32 is held in a range which has been set for the correct cutting insert. It can be determined that the cutting insert 412 is not a currently required cutting insert and that the cutting insert 412 (or the cutting tool 348) has been erroneously attached to the tool body 410 (or the turret 46), if the detected value of the electric current upon the direct contact is not held in the range which has been set for the correct cutting insert. In the latter case, the rotation of the main spindle 22 and the movement of the cutting tool 348 are stopped after the cutting tool 348 has been separated from the workpiece 32 by a predetermined distance, while at the same time the operator is informed by activations of an alarm light or buzzer and an alarm indicator that the cutting insert 412 is not a correct cutting insert. This step corresponds to a blade-selection checking step.

Further, the computer 80 determines that there is a possibility that the cutting insert 412 has been damaged, if the detected value of the electric current does not exceed the predetermined third value even after the cutting tool 348 has been moved to a predetermined position in which the cutting tool 348 should be brought into contact with the workpiece 32, namely, if the detected electric current value does not exceed the predetermined third value even while the relative position of the cutting tool 348 and the workpiece 32 detected by the rotary encoders 72, 74 satisfies a positional condition required for the contact of the two members 348, 32. After the determination of the possible damage of the cutting insert 412 has been made, the movement devices 56, 66 are commanded to immediately stop the movement of the cutting tool 348 toward the workpiece 32, and at the same time the alarm light or buzzer and the alarm indicator are activated to inform the operator that the cutting insert 412 has been possibly damaged. This step corresponds to a first breakage determining step.

Even after the workpiece 32 has started to be cut by the cutting tool 348, the computer 80 still keeps monitoring or reading the electric current value detected by the current detector 100. If the detected electric current value is reduced to be equal to or smaller than a predetermined fourth value during the cutting operation, the computer 80 determines that there is a possibility that the cutting insert 412 has been damaged, and then commands the movement devices 56, 66 to move the cutting tool 348 away from the workpiece 32. The cutting operation is immediately suspended, and the alarm light or buzzer is activated. The predetermined fourth value is set to be larger than the value of the electric current flowing through the cutting tool 348 and the workpiece 32 when the two members are shorted to each other by the cutting fluid. In either of this actual cutting stage and the above-described initial stage of the operation, the operator can take check the cutting tool 348 or cutting insert 412 in response to the activation of the alarm light or buzzer, so as to take a necessary procedure.

Figure 15:
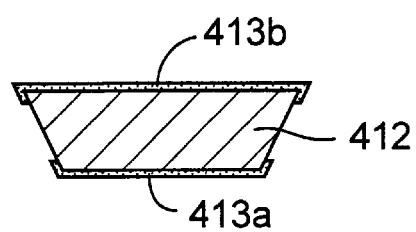
FIG. 15 is a view showing a cutting insert which is a modification of the cutting insert of FIG. 14.

As is clear from the above description, the portion of the conductive coating 413 which portion is interposed between the cutting insert 412 and the tool body 410 functions as a resistive coating, while the portion of the conductive coating which portion is interposed between the cutting insert 412 and the mater workpiece 92 upon the contact of the two members 92, 412 functions as a conductive coating. Therefore, the value of the resistance R3 provided by the former portion is preferably large, while the value of the resistance R4 provided by the latter portion is preferably small. In the present embodiment, the conductive coating 413 is formed in its entirety of a single material and has a constant thickness over its entirety, for facilitating manufacturing of the cutting insert 412 coated with the conductive coating 413. As described above, since the cross sectional area of the above-described former portion of the conductive coating 413 is considerably larger than that of the above-described latter portion of the conductive coating 413, the value of the resistance R3 is made considerably smaller than that of the resistance R4. However, it is desirable that value of the resistance R3 is larger than that of the resistance R4, in view of the above-described functions of the two portions of the conductive coating 413. Therefore, it is preferable that at least one of the values of the resistances R3, R4 is changed by making one of the two portions of the coating 413 different from the other portion in its thickness and/or material, such that at least one of an increase in the value of the resistance R3 and a reduction in the value of the resistance R4 is made. In this sense, the conductive coating 413 may be separated into two portions 413a, 413b, as shown in FIG. 15. In this modified arrangement, the portion 413a is interposed between the cutting insert 412 and the tool body 410, while the portion 413b is interposed between the cutting insert 412 and the master workpiece 92. The portions 413a, 413b are different in thickness and/or material from each other.

Further, as is apparent from the above descriptions, a portion of the computer 80, which portion is assigned to detect the contact position in which the cutting point of the cutting tool 348 is brought into contact with the master workpiece 92, constitutes a control device as defined in mode (19) which is described above in SUMMARY OF THE INVENTION. The first circuit 96 and the current detector 100 constitute a contact detecting device as defined in mode (18). A portion of the computer 80 which portion is assigned to execute the above-described checking step cooperates with the second circuit 98 to constitute a checking device as defined in mode (18). A portion of the computer 80 which portion is assigned to execute the above-described contact determining step constitutes a contact determining device as defined in mode (18). The first circuit 96 constitutes an on-off circuit as defined mode (35).

While the fixed resistor 106 in which the terminals 116, 118 are disposed in the opposite ends of the resistive body 114 is used in this embodiment, the fixed resistor 106 may be replaced by a resistive layer similar to the resistive layer 170 in the second embodiment of FIG. 5, such that the resistive layer is interposed between the cutting tool 348 and the turret 46.

While the cutting tool 348 is brought into contact at its cutting point with the outer circumferential surface of the master workpiece 92 in this embodiment, the cutting tool 348 may be brought into contact with an outer circumferential surface of the workpiece 32 as in the third embodiment of FIG. 6, or may be brought into contact with an outer circumferential surface of the main body 178 of the chuck 28 as in the fourth embodiment of FIG. 7. In the latter case, the main body 178 of the chuck 28 corresponds to a reference portion as defined in mode (8) which is described above in SUMMARY OF THE INVENTION. Where the cutting blade is brought into contact with the reference portion, it is necessary to surely prevent the reference portion from being damaged by the cutting blade. The damage of the reference portion can be effectively avoided, by bringing the cutting blade and the reference portion into contact with each other via the conductive coating which is provided to cover at least the cutting edge portion of the cutting blade, namely by using the cutting blade which is coated at its surface with the conductive coating. The use of the cutting blade coated with the coating is also effective to prevent chipping of the cutting blade, particularly, where the reference portion is hardened for preventing the portion from being damaged.

Figure 16:
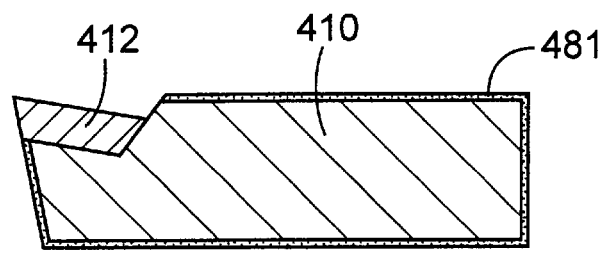
FIG. 16 is a view showing a cutting tool constructed according to an eleventh embodiment of the invention.

It is also possible to cover a surface of the cutting blade, the cutting tool or the cutting-tool holding member, with an electrically insulating coating. FIG. 16 shows a eleventh embodiment of the invention in which the tool body 410 of the cutting tool 348 is covered at its surface with an electrically insulating film or coating 481. The provision of the insulating coating 481 on the surface of the tool body 410 is effective to prevent the turret 46 and the tool body 410 of the cutting tool 348 from being shorted at their mutually adjacent portions to each other by a cutting fluid, cutting chips or other substance sticking to the surfaces of the turret 46 and the tool body 410 of the cutting tool 348, namely, prevent electrical connection between the mutually adjacent portions through a by-passing passage which is formed of the sticking substance and which is positioned in parallel with the fixed resistor 106 of the second circuit 98. Therefore, this arrangement advantageously avoids an erroneous determination that the cutting insert 412 of the cutting tool 348 has been brought into contact with the workpiece 32 or master workpiece 92. Such an erroneous determination could be caused by an increase in the detected value of the electric current as a result of the electrical connection between the turret 46 and the cutting tool 348, which is effectively prevented by the insulating coating 481 in this eleventh embodiment. The above-described cleaning step may be substituted for the provision of this electrically insulating coating 481 on the surface of the cutting tool, or alternatively may be implemented together with the provision of this insulating coating 481. In the latter case, the above-described erroneous determination can be more surely avoided. It is noted that the electrically insulating coating 481 is formed on the surface of the tool body 410 of the cutting tool 348 such that the insulating coating 181 covers the surface of the tool body 410 except portions of the surface which are to be held in contact with the cutting blade 412, the terminal 116 of the resistor 106 and the contact member 162.

Figure 17:
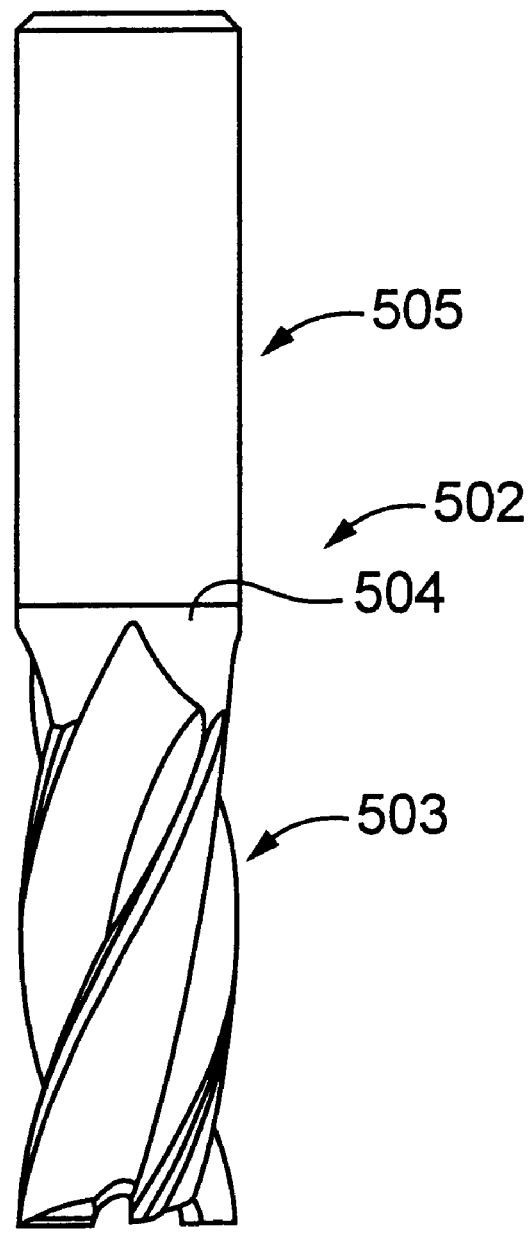
FIG. 17 is a view showing a rotary cutting tool constructed according to a twelfth embodiment of the invention.

It is also possible to form a conductive coating on a surface of a rotary cutting tool. FIG. 17 shows, as an example of the rotary cutting tool 192, an end mill 502 constructed according to a twelfth embodiment of the invention. The end mill 502 consists of a cutting blade portion 503, a shank portion 505 and a conductive coating 504 which covers the entire surface of the cutting blade portion 503. The conductive coating 504 may be adapted to cover not only the cutting blade portion 503 but also the shank portion 505. However, in this embodiment, the shank portion 205 is not covered with the conductive coating 504. The cutting blade portion 503 does not have to be covered at its entire surface with the conductive coating 504, but may be covered at least a cutting edge and its adjacent portion with the coating 540. However, in this embodiment, the cutting blade portion 503 is covered at its entire surface with the coating 504, for facilitating the formation of the coating 504.

Figure 18:
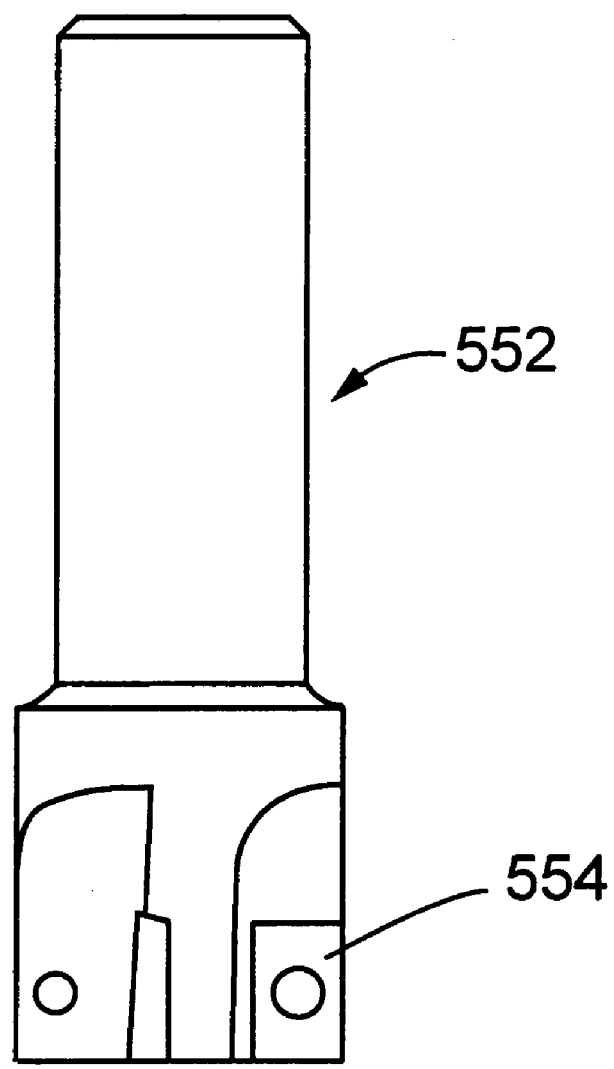
FIG. 18 is a view showing a rotary cutting tool constructed according to a thirteenth embodiment of the invention.

FIG. 18 shows, as another example of the rotary cutting tool 192, an end mill 554 constructed according to a thirteenth embodiment of the invention. This end mill 554 includes a cutting blade in the form of a replaceable cutting insert 554 which is replaceably fixed to a main body of the end mill 554. The cutting inset 554 is covered with a conductive coating.

Figure 19:
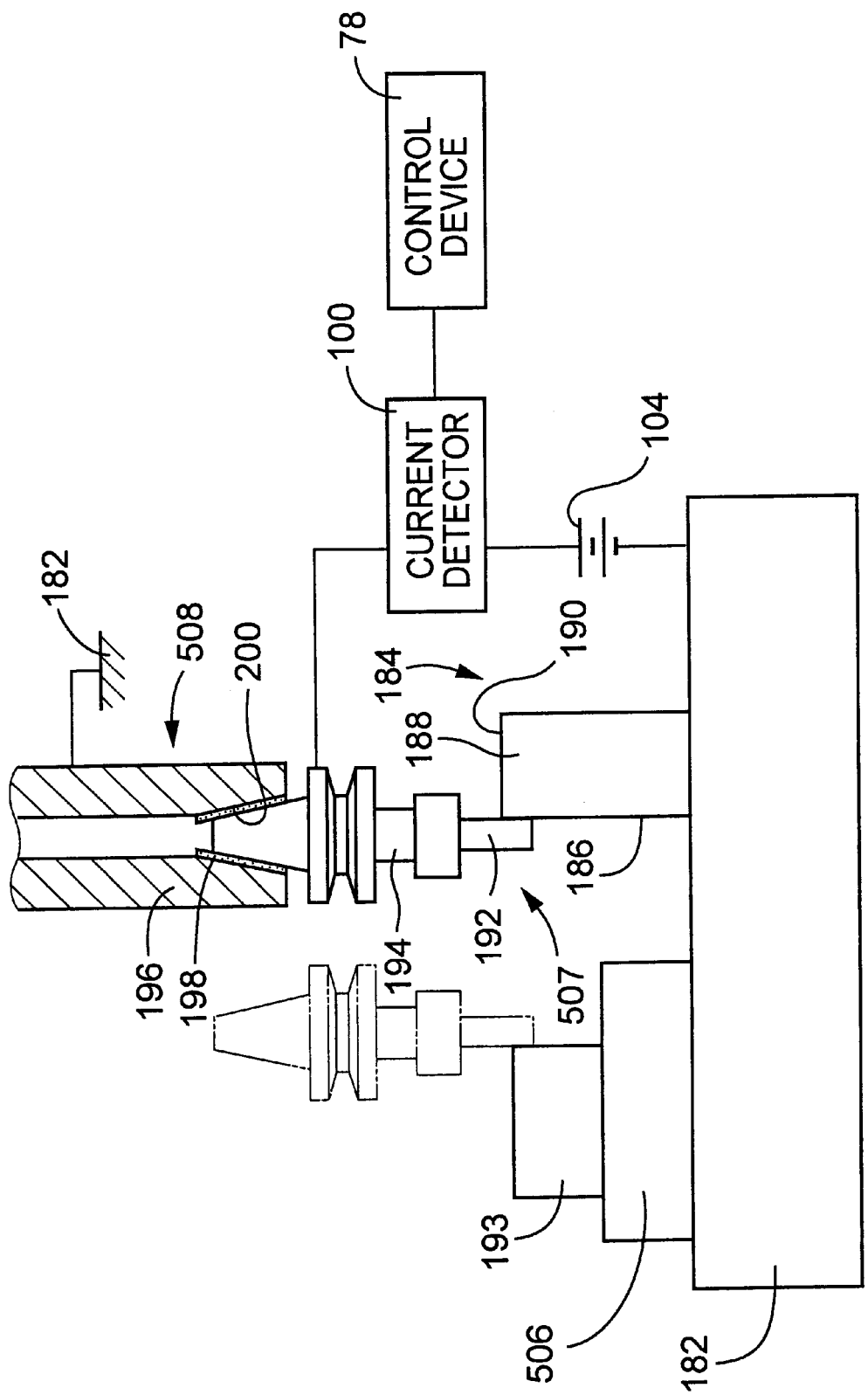
FIG. 19 is a block diagram schematically showing a cutting-blade-position controlling apparatus constructed according to a fourteenth embodiment of the invention.

Referring next to FIG. 19, there will be described a cutting-blade-position controlling apparatus which is constructed according to a fourteenth embodiment of this invention. This cutting-blade-position controlling apparatus is built in a machining center, a milling machine or a boring machine. An operation for milling or cutting the workpiece 193 with the rotary cutting tool 192 which is covered with the conductive coating 504, is carried out as follows:

The operation is initiated by attaching the tool holder 194 which holds the rotary cutting tool 192, and the workpiece 193, to the tool spindle 196 and a jig (or fixture) 506, respectively, so that; first and second circuits 507, 508 are formed. Described specifically, the DC power supply 104, the current detector 100, the tool holder 194, the rotary cutting tool 192, the reference portion 184 (or the workpiece 193, the jig 506) and the main structure 182 are arranged in series in the first circuit 507, while the DC power source 104, the current detector 100, the tool holder 194, the resistive layer 198, the tool spindle 196 and the main structure 182 are arranged in series in the second circuit 508.

After the formation of the first and second circuits 507, 508, a checking step is implemented by checking the electric current flowing through the second circuit 208, while a contact-position determining step is implemented by moving at least one of the tool spindle 196 and the reference portion 184 toward each other. During this movement toward each other, the cutting tool 192 is rotated at a velocity substantially equal to that at which the cutting tool 192 is rotated in a cutting operation for cutting the workpiece 193. When the cutting tool 192 is brought into contact with one of the reference surfaces 186, 188, 190 of the reference portion 184, the first circuit 507 is closed for allowing the electric current to flow through the first circuit 507 as well as the second circuit 508. The increase in the detected value of the flowing electric current enables the computer 80 to detect the transition of the first circuit 507 from its open state to its closed state. A relative position of the cutting tool 192 and the reference portion 184 upon the detection of the transition of the first circuit 507 is detected as an indirect contact position. A direct contact position of the cutting tool 192 and the reference portion 184 can be obtained, by offsetting the indirect contact position by an amount corresponding to the thickness of the conductive coating 504.

In this embodiment in which the cutting tool 192 is being rotated upon its contact with the reference portion 184, even where the cutting tool 192 has a plurality of cutting teeth or edges whose respective radial distances from the rotary axis of the cutting tool 192 are different from each other, it is possible to determine, as the contact position, the relative position in which the reference portion 184 is brought into contact with one of the cutting edges which has a larger radial distance from the rotary axis than the other cutting edges. Since the cutting tool 192 is brought into contact with the reference portion 184 via the conductive coating 504, there is no risk of cut of the reference portion 184 in spite of the rotation of the cutting tool 192 upon its contact with the reference portion 184.

Data representative of the contact position are stored, as contact position data, in a contact-position memory of the RAM 84 of the computer 80. If there are previous contact-position data with respect to the same cutting tool 192 in the contact-position memory, the previous contact-position data are replaced with the new contact-position data. The workpiece 193 is cut by the cutting tool 192 on the basis of the new or renovated contact-position data. The cutting tool 192 is first brought into contact with the workpiece 193 via the conductive coating 504, and then brought into direct contact with the workpiece 193 after destruction of the conductive coating 504, so as to start cutting the workpiece 193.

The diamond coating 504 covering the main body 503 of the rotary cutting tool 192 may be formed of a material, which is selected from among a plurality of materials having different electric resistance values. For example, where five kinds of cutting tools 192 whose respective axial lengths and/or diameters are different from each other are used for cutting the workpiece 193 at a machining center having an ATC (automatically tool changing) device, the main bodies 503 of the cutting tools 192 may be covered with the conductive coatings 504 which are made of five kinds of materials having respective electric resistance values different from each other and which have respective thicknesses equal to each other. Each of the main bodies 503 of the cutting tools 192 may be covered with one of the conductive coatings 504, which one is selected depending upon the kind of the cutting tool 192. In this arrangement, the value of the electric current flowing through the first circuit 507 upon the contact of each cutting tool 192 with the workpiece 193 varies depending upon the kind of the cutting tool 192. Described more specifically, when each cutting tool 192 is brought into contact with the workpiece 193, the value of the electric current flowing through the first and second circuits 507, 508 is detected so that the detected value is compared with five values which have been predetermined for the respective five kinds of cutting tools 192. It is then determined which one of the predetermined five values is closest to the detected value, or which one of the predetermined five values is substantially equal to the detected value with a difference therebetween being not larger than a predetermined amount. It is accordingly possible to know which one of the five kinds corresponds to the cutting tool 192 currently brought into contact with the workpiece 193.

Where it is known which one of the cutting tools 192 should be currently brought into contact with the workpiece 193, the detected value is compared with the predetermined value corresponding to the cutting tool 192 which should be currently brought into contact with the workpiece 193. If the detected value is substantially equal to the predetermined value with a difference therebetween being not larger than a predetermined amount, it can be determined that the cutting tool 192 currently fixed to the tool spindle 196 is a currently desired cutting tool, i.e., the cutting tool which should be currently brought into contact with the workpiece 193. If the difference between the detected value and the predetermined value is larger than the predetermined amount, it can be determined that the cutting tool 192 currently fixed to the tool spindle 196 is not the currently desired cutting tool, and that the cutting tool 192 is erroneously attached as a wrong cutting tool to the tool spindle 196. Therefore, this arrangement is effective to avoid a dangerous situation in which the operation is proceeded with the wrong cutting tool due to an erroneous operation of the operation or a malfunction of the ATC device of the machining center. It is noted that the conductive coating 204 may be considered as a kind of resistive coating in this embodiment, as is clear from the above description.

The conductive coating (resistive coating) does not have to cover necessarily the entire surface of the cutting blade portion of the rotary cutting tool, but may cover only a cutting edge and its adjacent portion, or only a further limited portion (e.g., an axially distal end portion of a drill). Further, the conductive coating may be adapted to cover the surface of a shank portion of the cutting tool at which portion the cutting tool is attached to the tool holding member. In any one of these arrangements, it is possible to identify the cutting tool and check if the currently attached cutting tool is a desired cutting tool or not. Further, also in a cutting tool including a main body and a replaceable cutting insert which is replaceably attached to the main body, the cutting inert may be covered (at its entirety, the cutting edge and its adjacent portion, or the contact portion to be held in contact with the main body) with a conductive coating made of a material, which is selected among a plurality of materials having respective electric resistance values different from each other, so that the cutting insert attached to the main body of the tool can be identified in substantially the same manner as described above. That is, the present technique for identifying the cutting tool can be applied to all types of cutting tools to be used in operations with machine tools.

Figure 20:
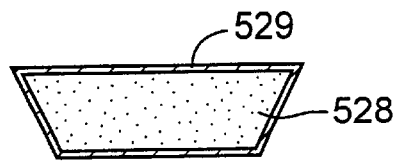
FIG. 20 is a view showing a cutting insert constructed according to a fifteenth embodiment of the invention.

While the cutting blade and the mater workpiece are made of materials each having a high degree of electrical conductivity in the above-described embodiments, these members may be made of electrically insulating materials or resistive materials. FIG. 20 shows a fifteenth embodiment of the invention in which a replaceable cutting insert 528 is made of a ceramic material or other electrically insulating material having a high degree of electric resistance. The cutting insert 528 is covered at its entire surface with an electrically conductive coating 529. This cutting insert 528 covered with the conductive coating 529 can be used in the same manner as the above-described cutting inserts made of the conductive materials, until a portion of the conductive coating 529 which portion covers a cutting edge and its adjacent potion is destroyed or removed as a result of a long service for cutting operations.

Figure 21:
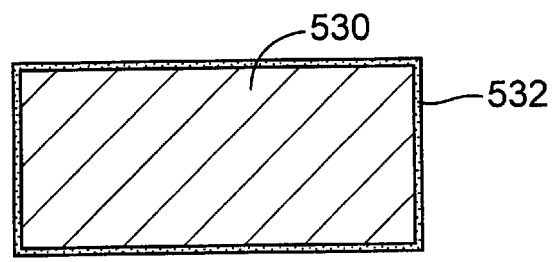
FIG. 21 is a view showing a master workpiece constructed according to a sixteenth embodiment of the invention.

While the cutting blade is covered with the conductive coating, the object may be covered, at a portion of its surface which is brought into contact with the cutting blade, with the conductive surface. FIG. 21 shows a sixteenth embodiment of the invention in which a conductive coating 532 is provided to cover a surface of a master workpiece 530 which has a known dimension or dimensions and which is to be attached to a workpiece holding member serving to hold a workpiece to be cut. This master workpiece 530 can be advantageously used with a standard cutting blade which is not covered with a conductive coating, for avoiding risk of chipping of cutting blade or damage of the master workpiece when the master workpiece 530 and the cutting blade are brought into contact with each other.

Figure 22:
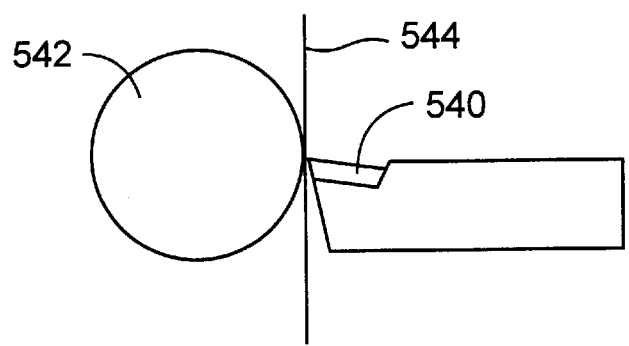
FIG. 22 is a view showing a conductive sheet, together with a cutting tool and a workpiece, which is constructed according to a seventeenth embodiment.

FIG. 22 shows a sixteenth embodiment of the invention in which an electrically conductive sheet 544 is positioned to be interposed between a cutting blade 540 and an object 542 when the cutting blade 540 and the object 542 are in contact with each other. Also in this arrangement, it is possible to avoid chipping of the cutting blade 540 or damage of the object 542, owing to the interposition of the conductive sheet 544 between the two members 540, 542.

It is to be understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A method of controlling a relative movement of a cutting blade and a workpiece which are moved relative to each other by a movement device in an operation with a machine tool, said method comprising a step of bringing said cutting blade and an object into contact with each other, by moving at least one of said cutting blade and said object toward each other by said movement device, and a step of controlling said relative movement on the basis of a relative position of said cutting blade and said object which is detected by said movement device upon said contact of said cutting blade and said object with each other, said method further comprising:

a checking step of checking, with a checking device if a contact detecting device for detecting said contact of said cutting blade and said object is in a normal condition in which said contact detecting device is capable of detecting said contact when said cutting blade and said object are brought into contact with each other; and a contact determining step of determining that said cutting blade and said object have been brought into contact with each other, in accordance with an output provided by said contact detecting device.

2. A method according to claim 1, wherein said object consists of said workpiece, which is fixed to said machine tool.

3. A method according to claim 1, wherein said object consists of a master workpiece, which is fixed to said machine tool.

4. A method according to claim 1, wherein said object consists of a reference portion of said machine tool.

5. A method according to claim 1, wherein said cutting blade consists of a cutting insert attached to a main body of a cutting tool, said main body including a shank portion and cooperating with said cutting insert to constitute said cutting tool.

6. A method according to claim 1, wherein said cutting blade consists of at least a part of a rotary cutting tool which is attached to a tool spindle of said machine tool.

7. A method according to claim 6, wherein said cutting blade and said object are brought into contact with each other while said rotary cutting tool is being rotated.

8. A method according to claim 1, further comprising a breakage determining step of determining that there is a possibility that said cutting blade has been damaged, if said contact of said cutting blade and said object is not detected while said relative position detected by said movement device satisfies a positional condition required for said contact of said cutting blade and said object.

9. A method according to claim 1, further comprising a touch-probe detecting step of detecting a contact of said object and a touch probe which is provided to be unmovable relative to said cutting blade.

10. A method according to claim 1, wherein said contact determining step includes an actual-contact determining step of determining that said cutting blade and said object are actually brought into contact with each other when a predetermined first condition is satisfied, and wherein said predetermined first condition is different from a predetermined second condition which is required to determine that said cutting blade and said object are spaced apart from each other and are shorted to each other by a cutting fluid, so that an actual contact of said cutting blade and said object is distinguishable from a short of said cutting blade and said object by said cutting fluid.

11. A method according to claim 1, wherein said cutting blade is held by a blade holding member, and wherein said cutting blade and said object are brought into contact with each other while a conductive layer having an electrical conductivity is provided in at least one of a space between said cutting blade and said blade holding member, and a space between said cutting blade and said object.

12. A method of controlling a relative movement of a cutting blade and a workpiece which are moved relative to each other by a movement device in an operation with a machine tool, said method comprising a step of bringing said cutting blade and an object into contact with each other, by moving at least one of said cutting blade and said object toward each other by said movement device, and a step of controlling said relative movement on the basis of a relative position of said cutting blade and said object which is detected by said movement device upon said contact of said cutting blade and said object with each other, said method further comprising:

a first-circuit preparing step of preparing a first circuit which includes said object and said cutting blade arranged in series to each other and which is connected to a power source, said first circuit being closed when said cutting blade and said object are in contact with each other, while being open when said cutting blade and said object are not in contact with each other;

a second-circuit preparing step of preparing a second circuit which includes a resistance and which is connected in parallel with said first circuit, said second circuit being closed irrespective of whether said cutting blade and said object are in contact with each other or not;

a checking step of detecting a state of said power source by a power source detector when said first circuit is open, and checking if each of said power source and said power source detector is in a normal condition; and a contact-position determining step of determining, as a contact position in which said cutting blade and said object are brought into contact with each other, said relative position of said cutting blade and said object when said state of said power source detected by said power source detector indicates transition from an open state in which said first circuit is open, to a closed state in which said first circuit is closed.

13. A method according to claim 12, wherein said checking step is implemented to detect a value of an electric current flowing from said power source when said first circuit is open, and determine that each of said power source detector and said power source is in said normal condition if the detected value of said electric current is not smaller than a predetermined first value which is larger than zero and is not larger than a predetermined second value which is larger than said predetermined first value.

14. A method according to claim 13, wherein said contact-position determining step is implemented to determine, as said contact position, said relative position of said cutting blade and said object when said value of said electric current flowing from said power source exceeds a predetermined third value which is larger than said predetermined second value.

15. A method according to claim 12, wherein said resistance of said second circuit is connected between two mutually-insulated members, said method further comprising a covering step of covering a surface of at least one of said two mutually-insulated members, with an insulating layer made of an electrically insulating material, for preventing said state of said power source from erroneously indicating the transition from said open state to said closed state when said two mutually-insulated members are shorted to each other by a substance sticking to said mutually-insulated members while said cutting blade and said object are not in contact with each other.

16. A method of controlling a relative movement of a cutting blade and a workpiece which are moved relative to each other by a movement device in an operation with a machine tool, said method comprising a step of bringing said cutting blade and an object into contact with each other, by moving at least one of said cutting blade and said object toward each other by said movement device, and a step of controlling said relative movement on the basis of a relative position of said cutting blade and said object which is detected by said movement device upon said contact of said cutting blade and said object with each other, said method further comprising:

a resistance-circuit preparing step of preparing a resistance circuit in which said object and said cutting blade are connectable to each other via a first resistance which has a predetermined first resistance value;

a checking step of checking, with a checking device, if a value of an electric resistance acting between said object and said cutting blade is substantially equal to said predetermined first resistance value of said first resistance when said cutting blade and said object are not in contact with each other; and a contact determining step of determining that said cutting blade and said object have been brought into contact with each other when said value of said electric resistance acting between said object and said cutting blade is reduced to be smaller than a predetermined second resistance value which is smaller than said first resistance value.

17. An apparatus for controlling a relative movement of a cutting blade and a workpiece which are moved relative to each other by a movement device in an operation with a machine tool, said apparatus controlling said relative movement on the basis of a relative position of said cutting blade and an object which is detected by said movement device when said cutting blade and said object are brought into contact with each other as a result of a relative movement of said cutting blade and said object which is made by said movement device, said apparatus comprising:

a first circuit which includes said object and said cutting blade arranged in series to each other and which is connected to a power source, said first circuit being closed when said cutting blade and said object are in contact with each other, while being open when said cutting blade and said object are not in contact with each other;

a second circuit which includes a resistance and which is connected in parallel with said first circuit, said second circuit being closed irrespective of whether said cutting blade and said object are in contact with each other or not;

a power source detector which detects a state of said power source; and a control device which commands said movement device to move said cutting blade and said object relative to each other if each of said power source and said power source detector is indicated normal by said power source detector when said first circuit is open, said control device controlling said movement device on the basis of said relative position of said cutting blade and said object which is detected by said movement device when said state of said power source detected by said power source detector indicates transition from an open state in which said first circuit is open, to a closed state in which said first circuit is closed.

18. An apparatus according to claim 17, further comprising an insulator which electrically insulates a main body portion of said machine tool from said cutting blade wherein said resistance is connected between said main body portion, and at least one of said cutting blade and a member which has an electrical continuity with said cutting blade.

19. An apparatus according to claim 17, further comprising an insulator which electrically insulates a main body portion of said machine tool from a workpiece holding member which holds said workpiece, wherein said resistance is connected between said main body portion, and at least one of said workpiece holding member and a member which has an electrical continuity with said workpiece holding member.

20. An apparatus according to clam 19, wherein said resistance consists of a resistor built in one of a workpiece holding member which holds said workpiece, and a component of a main body portion of said machine tool.

21. An apparatus according to claim 17, wherein said resistance includes a resistive layer which is interposed between members each made of an electrically conductive material.

22. An apparatus according to claim 17, wherein said resistance consists of a resistor including a resistive body and a pair of terminals which are respectively disposed in opposite ends of said resistive body.

23. An apparatus according to claim 17, wherein said resistance is built in one of a cutting tool which includes at least said cutting blade, and a tool holding member which holds said cutting tool.

24. An apparatus according to claim 17, further comprising:

an insulator which electrically insulates a main body portion of said machine tool, from one of said cutting blade and said workpiece;

a first conductive passage which is connected at one of opposite ends thereof to said one of said cutting blade and said workpiece, and which is connected at the other of said opposite ends to said power source;

a second conductive passage which connects said power source to said main body portion of said machine tool;

a current detector which detects an electric current flowing through said first circuit that includes said first and second conductive passages; and a third conductive passage which connects said one of said cutting blade and said workpiece, to said main body portion of said machine tool via said resistance, said third conductive passage being included in said second circuit, wherein said third conductive passage is shorter than said first conductive passage.

25. An apparatus according to claim 24, wherein said resistance consists of a resistor including a resistive body and a pair of terminals which are respectively disposed in opposite ends of said resistive body, and wherein said resistor and said third conductive passage are built in one of a cutting tool which includes at least said cutting blade, and a tool holding member which holds said cutting tool.

26. An apparatus according to claim 24, wherein said resistance consists of a resistor including a resistive body and a pair of terminals which are respectively disposed in opposite ends of said resistive body, and wherein said resistor and said third conductive passage are built in one of a workpiece holding member which holds said workpiece, and a component of a main body portion of said machine tool.

27. An apparatus according to claim 17, wherein said resistance of said second circuit is connected between two members, and wherein at least one of said two members is covered, at at least a portion of a surface thereof which portion is adjacent to a surface of the other of said two members, with an insulating layer which is made of an electrically insulating material.

28. An apparatus according to claim 17, further comprising:
a touch probe which is provided to be unmovable relative to said cutting blade, and;
an on-off circuit which includes an object and said touch probe arranged in series to each other and which is connected to a power source, said on-off circuit being closed when said touch probe and said object are in contact with each other, while being open when said touch probe and said object are not in contact with each other.

29. An apparatus according to claim 17, wherein said control device determines that said cutting blade and said object are actually brought into contact with each other when a predetermined first condition is satisfied, and wherein said predetermined first condition is different from a predetermined second condition which is required to determine that said cutting blade and said object are spaced apart from each other and are shorted to each other by a cutting fluid, so that an actual contact of said cutting blade and said object is distinguishable from a short of said cutting blade and said object by said cutting fluid.

30. An apparatus according to claim 17, wherein said control device include a breakage determining portion which determines that there is a possibility that said cutting blade has been damaged, if said contact of said cutting blade and said object is not detected while said relative position detected by said movement device satisfies a positional condition required for said contact of said cutting blade and said object.

31. A method of detecting contact and separation of a cutting blade held by a blade holding member, with and from an object, on the basis of a change of a state of an electric circuit which is changed depending upon whether said cutting blade is in contact with said object or is separated from said object, said method comprising:
a step of bringing said cutting blade and said object into contact with each other, while a conductive layer having electrical conductivity is provided in at least one of a space between said cutting blade and said blade holding member, and a space between said cutting blade and said object;
wherein said conductive layer consists of a resistive coating which covers at least a cutting edge of said cutting blade and an adjacent portion of said cutting blade which portion is adjacent to said cutting edge, said method further comprising:
a cutting-blade identifying step of determining that said cutting blade is a currently required cutting blade if said state of said electric circuit satisfies a predetermined condition when said cutting blade is in contact with said object via said resistive coating, and determining that said cutting blade is not the currently required cutting blade if said state of said electric circuit does not satisfy said predetermined condition when said cutting blade is in contact with said object via said resistive coating, said predetermined condition including at least one of a current-value-related requirement that a value of electric current flowing through said electric circuit upon contact of said cutting blade with said object via said resistive coating is held in a predetermined range, and a resistance-value-related requirement that a value of electric resistance acting on said electric circuit upon said contact is held in a predetermined range.

32. A method of detecting contact and separation of a cutting blade held by a blade holding member, with and from an object, on the basis of a change of a state of an electric circuit which is changed depending upon whether said cutting blade is in contact with said object or is separated from said object, said method comprising:
a step of bringing said cutting blade and said object into contact with each other, while a conductive layer having electrical conductivity is provided in at least one of a space between said cutting blade and said blade holding member, and a space between said cutting blade and said object;
wherein said conductive layer consists of a resistive coating which covers at least a contact surface of said cutting blade that is held in contact with said blade holding member, said method further comprising:
a cutting-blade identifying step of determining that said cutting blade is a currently required cutting blade if said state of said electric circuit satisfies a predetermined condition when said cutting blade is in contact with said object via said resistive coating, and determining that said cutting blade is not the currently required cutting blade if said state of said electric circuit does not satisfy said predetermined condition when said cutting blade is in contact with said object via said resistive coating, said predetermined condition including at least one of a current-value-related requirement that a value of electric current flowing through said electric circuit upon contact of said cutting blade with said object via said resistive coating is held in a predetermined range, and a resistance-value-related requirement that a value of electric resistance acting on said electric circuit upon said contact is held in a predetermined range.

33. A method of detecting contact and separation of a cutting blade held by a blade holding member, with and from an object, on the basis of a change of a state of an electric circuit which is changed depending upon whether said cutting blade is in contact with said object or is separated from said object, said method comprising:
a step of bringing said cutting blade and said object into contact with each other, while a conductive layer having electrical conductivity is provided in at least one of a space between said cutting blade and said blade holding member, and a space between said cutting blade and said object;
wherein said cutting blade held by said blade holding member includes a cutting edge, an adjacent portion adjacent to said cutting edge and a contact surface held in contact with said blade holding member, and wherein at least said cutting edge, said adjacent portion and said contact surface of said cutting blade are covered with a conductive coating as said conductive layer, said method further comprising:
a moving step of moving at least one of said cutting blade and said object toward each other such that said cutting edge is brought into contact with said object via said conductive coating;
a memorizing step of memorizing, as a contact position, a relative position of said cutting blade and said object upon contact of said cutting edge with said object via said conductive coating;
a movement-controlling step of controlling a relative movement of said cutting blade and a workpiece which is to be cut by said cutting blade and a workpiece which is to be cut by said cutting blade, on the basis of said contact position memorized in said memorizing step; and a cutting-blade identifying step of determining that said cutting blade is not a currently required cutting blade if said state of said electric circuit including said workpiece, said cutting blade and said blade holding member which are arranged in series to each other, does not satisfy a predetermined condition when said conductive coating covering said cutting edge is destroyed due to contact of said cutting blade with said workpiece as a result of said relative movement of said cutting blade and said workpiece, wherein said predetermined condition includes at least one of a current-value-related requirement that a value of electric current flowing through said electric circuit upon destruction of said conductive coating is held in a predetermined range, and a resistance-value-related requirement that a value of electric resistance acting on said electric circuit upon destruction of said conductive coating is held in a predetermined range, said predetermined condition being determined to be not satisfied if said at least one of said current-value-related requirement and said resistance-value-related requirement is not satisfied.

34. A method according to claim 33, wherein said object consists of said workpiece which is to be cut by said cutting blade.

35. A method of identifying a plurality of cutting blades each including a cutting edge and an adjacent portion which is adjacent to said cutting edge, comprising:

a covering step of covering at least said cutting edge and said adjacent portion of each of said cutting blades with a resistive coating made of a material, which is selected among a plurality of materials having respective electric resistance values different from each other, depending upon a kind of each of said cutting blades;

a blade setting step of setting one of said cutting blades in a blade holding member such that said one of said cutting blades is held by said blade holding member, for thereby forming an electric circuit including said one cutting blade, said blade holding member and an object which is contactable with and separable away from said cutting blade and which is arranged in series with said one cutting blade and said blade holding member; and a blade identifying step of identifying a kind of said one cutting blade which is currently held by said blade holding member, on the basis of a state of said electric circuit when said cutting edge of said cutting blade is in contact with said object via said resistive coating.

36. A method according to claim 35, wherein said state of said electric circuit is represented by at least one of a value of electric current flowing through said electric circuit, and a value of electric resistance acting on said electric circuit.

37. A method according to claim 36, further comprising a blade-selection checking step of determining that said one cutting blade is a currently required cutting blade if a predetermined condition is satisfied, and determining that said one cutting blade is not the currently required cutting blade if said predetermined condition is not satisfied, wherein said predetermined condition includes at least one of a current-value-related requirement that said value of said electric current is held in a predetermined range, and a resistance-value-related requirement that said value of said electric resistance is held in a predetermined range.

38. A method of identifying a plurality of cutting blades each including a cutting edge and a contact surface which is held in contact with a blade holding member, comprising:

a covering step of covering at least said contact surface of each of said cutting blades with a resistive coating made of a material, which is selected among a plurality of materials having respective electric resistance values different from each other, depending upon a kind of each of said cutting blades;

a blade setting step of setting one of said cutting blades in a blade holding member such that said one of said cutting blades is held at said contact surface by said blade holding member, for thereby forming an electric circuit including said one cutting blade, said blade holding member and an object which is contactable with and separable away from said cutting blade and which is arranged in series with said one cutting blade and said blade holding member; and a blade identifying step of identifying a kind of said one cutting blade which is currently held by said blade holding member, on the basis of a state of said electric circuit when said cutting edge of said cutting blade is in contact with said object.

39. An apparatus according to claim 17, wherein said cutting blade is held by a blade holding member, and wherein said cutting blade and said object are brought into contact with each other while a conductive layer having an electrical conductivity is provided in at least one of a space between said cutting blade and said blade holding member, and a space between said cutting blade and said object.

* * * * *